(12) United States Patent
Prust et al.

(10) Patent No.: US 9,291,293 B2
(45) Date of Patent: Mar. 22, 2016

(54) QUICK-CONNECT HYDRAULIC COUPLING SOCKET

(75) Inventors: David Josef Ludwig Prust, Aachen (DE); Christian Loehr, Aachen (DE); Martin Inderelst, Aachen (DE)

(73) Assignee: RHEINISCH-WESTFAELISCHE-TECHNISCHE HOCHSCHULE AACHEN, Aachen (DE)

( * ) Notice: Subject to any disclaimer, the term of this patent is extended or adjusted under 35 U.S.C. 154(b) by 447 days.

(21) Appl. No.: 13/641,865

(22) PCT Filed: Oct. 4, 2010

(86) PCT No.: PCT/EP2010/006033
§ 371 (c)(1),
(2), (4) Date: Jan. 4, 2013

(87) PCT Pub. No.: WO2011/134484
PCT Pub. Date: Nov. 3, 2011

(65) Prior Publication Data
US 2013/0206261 A1    Aug. 15, 2013

(30) Foreign Application Priority Data
Apr. 30, 2010 (DE) .......................... 10 2010 019 094

(51) Int. Cl.
*F16L 29/00* (2006.01)
*F16L 37/34* (2006.01)
*F16L 37/35* (2006.01)
*F16L 37/36* (2006.01)

(52) U.S. Cl.
CPC ................ *F16L 29/00* (2013.01); *F16L 37/34* (2013.01); *F16L 37/35* (2013.01); *F16L 37/36* (2013.01); *Y10T 137/9029* (2015.04)

(58) Field of Classification Search
CPC ........... F16L 37/08; F16L 37/30; F16L 37/32; F16L 37/38; F16L 37/40; F16L 37/34; F16L 29/00; F16L 37/35; F16L 37/36; Y10T 37/9029
USPC .......... 137/614.02–614.05; 251/149.1, 149.6; 285/306, 316
See application file for complete search history.

(56) References Cited

U.S. PATENT DOCUMENTS

| 3,721,705 A | 3/1973 | Nakajima et al. |
|---|---|---|
| 4,865,292 A | 9/1989 | Ekman |

(Continued)

FOREIGN PATENT DOCUMENTS

EP    0542342 A    5/1993

*Primary Examiner* — Kevin Lee
(74) *Attorney, Agent, or Firm* — Andrew Wilford

(57) ABSTRACT

The invention relates to a hydraulic coupling bush (1), comprising a bush housing (4), in particular a sleeve-shaped hush housing (4), in which a hush tappet (12), an axially movable compression sleeve (13) that surrounds the hush tappet (12) in an axially parallel manner, in particular coaxially, and an axially movable retaining sleeve (16) that surrounds the compression sleeve (13) in an axially parallel manner, in particular coaxially, are arranged in an axially parallel manner, in particular coaxially, the outer surface of the retaining sleeve supporting or releasing securing elements (18) arranged in the bush housing (4) in the dial direction and the in particular annular end face (16a) of the retaining sleeve lying at least substantially in one plane with the end faces (12a) of the bush tappet (12) and of the bush housing (4) in the decoupled state, wherein the compression sleeve is ex posed from the inside to a hydraulic fluid to be conveyed through the bush at least substantially without applying axial force to the compression sleeve.

25 Claims, 20 Drawing Sheets

(56) References Cited

U.S. PATENT DOCUMENTS

| | | |
|---|---|---|
| 5,123,446 A | 6/1992 | Haunhorst |
| 5,988,216 A | 11/1999 | Schumacher |
| 6,026,857 A | 2/2000 | Stucchi |
| 6,029,701 A | 2/2000 | Charfardon |
| 6,158,717 A * | 12/2000 | Van Scyoc et al. ........ 251/149.6 |
| 6,217,080 B1 * | 4/2001 | Imai .......................... 137/614.06 |
| 6,776,187 B1 * | 8/2004 | Marquis et al. .......... 137/614.04 |
| 6,830,059 B1 | 12/2004 | Zeiber |

* cited by examiner

QUICK-CONNECT HYDRAULIC COUPLING SOCKET

CROSS REFERENCE TO RELATED APPLICATIONS

This application is the US-national stage of PCT application PCT/EP2010/006033 filed 4 Oct. 2010 and claiming the priority of German patent application 102010019094.2 itself filed 30 Apr. 2010.

BACKGROUND OF THE INVENTION

The invention concerns a hydraulic coupling socket with a housing, in particular an axially extending sleeve holding an axially, preferably coaxial, plunger, an axially movable pusher sleeve that surrounds the plunger, preferably coaxially, and an axially movable retaining sleeve surrounding the pusher sleeve, also preferably coaxially, whose surface radially braces or frees latch elements mounted in the housing, the in particular annular end face of the retaining sleeve lying coplanar with the end faces of the plunger and the housing in a decoupled position.

Hydraulic coupling sockets of this type are known from the prior art, and are used in conjunction with similar hydraulic coupling plugs, such that the plug and the socket can be coupled with one another in order to conduct a hydraulic fluid.

Couplings of this type are used, for example in order to connect an existing hydraulic circuit in a relatively fast and easy manner with various tools, or to disconnect it from them. For example, they are used in agricultural and construction machine construction in order to conduct hydraulic oil from one hydraulic pump to a tool and back to a recovery tank.

The known design of such hydraulic coupling sockets is such that the plunger extends axially so as to be in a fixed coaxial position in the housing, and has an outer, roughly circular end face.

In a design known to the prior art, the area facing away from the end face of the plunger forms a seat surface that can interact with a rear free end of the above-described pusher sleeve in order to close the inside of the pusher sleeve to the passage of fluid when the axially movable pusher sleeve is moved axially from the side facing away from the end face, and thus from the inside of the housing toward a hydraulic coupling plug, and is lying on the plunger.

In this prior-art design, the working hydraulic fluid is applied to the interior of the outer area of the pusher sleeve that interacts with a plunger, such that this fluid can only flow into a connected hydraulic coupling plug if the pusher sleeve has moved axially away from the plunger or its seat surface. To this end, in the prior-art hydraulic coupling sockets, the pusher sleeve is axially movable in the housing, such that the fluid passage can optionally be opened and closed. In this design, the pusher sleeve is a passage for the hydraulic fluid to be conducted, which can be closed by relative movement between the pusher sleeve and the plunger. This passage holds the plunger that is surrounded by the hydraulic fluid to be conducted.

As described below with regard to the invention, the fluid passage can also be designed differently, although it is also essential here for the fluid passage to be able to be closed or opened by relative axial movement between the sleeve and the plunger.

In the prior art a retaining sleeve coaxially surrounds the pusher sleeve and the plunger, and has an annular end face surrounding the plunger, which, when decoupled, is coplanar with the end face of the plunger and the end face of the outer housing, such that a decoupled hydraulic coupling socket has a substantially flat, smooth outer surface on its end.

The retaining sleeve can be moved in particular against a prestressing spring force axially into the housing, and, when decoupled and over part of its movement path, supports latch elements that are radially movable within the wall of the housing, in particular in the area of the outer end that faces a hydraulic coupling plug, whereby such latch elements are, for example balls.

"Movement into the housing" refers here and below in the description of the invention to the fact that movement of the respective element goes toward the fluid supply of the hydraulic coupling socket, i.e. in particular away from a hydraulic coupling plug to be coupled.

By inserting a hydraulic coupling plug into the socket, the plunger, which is fixed in the prior art, and a corresponding plunger of the hydraulic coupling plug come into contact with one another such that the hydraulic coupling plug moves axially into its housing to cause an outer housing area to move the retaining sleeve and be inserted further into the housing, thus opening, with respect to the plug whose plunger is moving inside the housing, a fluid passage in the hydraulic coupling plug.

By inserting the housing sufficiently far into the housing, the retaining sleeve is moved so far axially into the housing that its end face is no longer supported by the latch elements, which, upon further movement, lie on the outer surface of the housing, until the housing is inserted into the housing up to a ring groove on this surface, such that the latch elements, for example balls, can engage with this ring groove, for example fall into it. In such a position, the plug is axially secured in the socket, whereby accidental separation of the plug from the socket can be prevented by holding the latch elements in the engaged position with the groove of the housing by a sliding sleeve (for example under spring tension) on the outside of the housing.

When the housing is inserted into the housing, once the retaining sleeve around the pusher sleeve has been moved a certain distance, the retaining sleeve moves onto a limit stop of the pusher sleeve, such that, for the rest of the path of insertion of the plug into the socket, the axially moved retaining sleeve simultaneously moves the pusher sleeve, such that its free outer end moves away from the sealing area of the plunger, thus opening the fluid passage.

In order to achieve the axial movements described here, in the prior art, in particular also in the case of the invention described below, the individual movable parts are preferably coaxial to one another and positioned in or on one another. In the invention, an axially parallel, non-coaxial arrangement of the parts to one another is also possible.

For example, the movability of the retaining sleeve arises from the fact that its external diameter is such relative the internal diameter of the housing that they can slide on one another. Likewise, the pusher sleeve can be positioned with an external contact area of the inner wall of the retaining sleeve and/or an additional internal area of the housing for axial movement.

Movement is such that, in the prior-art design, the hydraulic fluid supplied to the socket through a hydraulic connection can enter into the pusher sleeve, and can only move into a plug after removing the pusher sleeve from the seat surface of the plunger.

One disadvantage of the prior-art hydraulic coupling socket is considered to be the fact that, due to the existing movement paths, the pusher sleeve is already moved, thus opening the fluid passage to the plug, even if the plug is not yet securely fastened on it by interlocking with the latch elements in the housing. This allows hydraulic fluid to exit the socket, which may harm the environment.

An additional disadvantage is considered to be the fact that, on the one hand, plugs of a prior-art design must be moved with an axially movable plunger with respect to an external housing against the fluid pressure inside the plug when coupling, and, on the other, starting on the above-described path of movement of the retaining sleeve, by which it comes into contact with the pusher sleeve, movement of the plug must also move the pusher sleeve against the pressure within the socket of the hydraulic fluid to be moved. In the prior-art designs of the hydraulic coupling socket, the pressure of the hydraulic fluid to be moved acts on the annular end face of the pusher sleeve on the side of the hydraulic fluid connection, thus, together with any dilated surfaces of the pusher sleeve, causes significant forces axially toward the end face of the plunger or he plug, which counteract movement of the pusher sleeve by the plug.

This must be considered a disadvantage, inasmuch as it is impossible for the operator to manually generate the forces necessary in lines that are under pressure. Thus, normally it is necessary when coupling, first to decompress the hydraulic system in order to allow for the plunger to move into the housing and the pusher sleeve to move into the housing.

Object of the Invention

Thus, the object of the invention is to further improve a hydraulic coupling socket to provide an easily built, depressurized hydraulic coupling socket, such that, at least the socket does not have to overcome any countervailing forces during coupling, in particular in which countervailing forces are substantially eliminated if sockets according to the invention are used in conjunction with depressurized hydraulic coupling plugs.

In this regard, "substantial elimination" of forces refers to the fact that, at most, the only forces remaining are such that an operator can simply overcome them manually, in particular forces less than 200, preferably less than 100 newtons.

An alternative or further object is also to avoid the danger of leakage, in particular such that an inserted plug is securely sealed initially before opening the fluid passage in the hydraulic coupling socket.

Alternatively, or in addition to the above-described objects, it is an object of the invention to couple hydraulic coupling plugs with a socket according to the invention even if they are under pressure and were not previously depressurized. Thus, the object is to make it possible with the hydraulic coupling socket according to the invention for an operator to couple the plug and the socket using only the available manual force.

SUMMARY OF THE INVENTION

According to one aspect of the invention, the first object mentioned is achieved by at least substantially axial force-free application to the inside of the pusher sleeve of a hydraulic fluid to be conducted through the socket.

Thus, at the core of the invention is the idea that, the pressure applied by the hydraulic fluid to be conducted should not generate any significant axial forces to be overcome during coupling that act on the pusher sleeve, in particular if the socket is closed before coupling.

"No significant forces", in turn, means that, at most, axial forces remain that can be manually generated without difficulty, in particular forces of less than 200, and preferably less than 100 newtons. In a preferred embodiment, on the other hand, the design is such that no effective axial forces counteracting the coupling process are generated by the application of fluid pressure on the inside.

Unlike the prior art, in which sockets with several hundred bar of internal pressure were impossible to couple by hand, the invention makes it possible to couple by hand without prior depressurization.

In one embodiment, it may be provided that the pusher sleeve is biased by a compression spring toward the end face of the plunger, i.e. toward a plug to be coupled. This ensures that effective clamp force acts on the pusher sleeve, preventing the passage of fluid between the pusher sleeve and the plunger or too easy opening, even if no more effective axial force is present due to the application of fluid pressure.

The application of pressure, free of axial forces, to the pusher sleeve is especially simplified if the plunger has an inner passage pressurized the hydraulic fluid to be conducted that extends from a hydraulic fluid connection toward the end face of the plunger, and, axially in outer of its end face, opens into at least one opening on the outer surface of the plunger, by which the pusher sleeve is pressurized from inside, whereby axially inward and outward of the at least one opening, the pusher sleeve and the plunger are sealed and movably positioned on one another. In particular, this creates a closed space between the plunger and the pusher sleeve that is applied through the hydraulic fluid.

This design advantageously ensures that no pressurization of the supply-side annular end face by the hydraulic fluid is possible, thus avoiding a very large force part present in the prior art, which only provides for a seal between the pusher sleeve and the plunger on the plug side in the area of the end face of the plunger.

In one possible embodiment of this way of positioning the pusher sleeve securely on the plunger and movably, it can be provided that, axially inward and outward of the at least one opening, the pusher sleeve and the plunger lie, secured to one another, on different seal diameters, whereby surfaces applied on the pusher sleeve by hydraulic fluid to be conducted are provided, of which at least one surface generates forces acting axially on the pusher sleeve toward the hydraulic fluid connection, and of which at least one surface generates forces acting axially on the pusher sleeve toward the end face of the plunger, whereby the forces vectorially add up to a sum of nil or to a remaining force directed toward the end face that can be overcome manually during coupling.

The design of the seal on various seal diameters has the advantage that the plunger and/or pusher sleeve can have different internal and/or external diameters over their axial length, simplifying design, and a course with a tapering internal and/or external diameter, in particular, a gradually tapering course of the pusher sleeve and/or the plunger, by which, in particular, limit stops can be created that take effect during movement. Furthermore, the design possibilities for a configuration with improved drift dynamics are significantly improved. The effectively perfused cross-sectional area is also increased, which results in low flow losses once the strength of the materials must be taken into account at high operating pressures.

Surfaces that generate axially acting forces through the pressurization with hydraulic fluid can then be annular surfaces of this type, present on the inner and/or outer diameter levels of the pusher sleeve.

Essentially such areas of the surface, in particular annular surfaces, will generate axial forces acting toward the end face of the socketing plunger and the pusher sleeve formed on diameter levels on which the internal diameter of the pusher sleeve is formed so as to taper from the fluid connection side to the end face of the plunger. Such forces thus keep the fluid passage closed and counteract coupling, as they press the pusher sleeve against the plug.

Thus, in a preferred further elaboration, it can be provided that at least one surface of the pusher sleeve pressurized by hydraulic fluid to be conducted, that generates a force directed axially to the hydraulic fluid connection, is provided on the outer wall of the pusher sleeve, which is pressurized by hydraulic fluid through a connection passage in the pusher sleeve wall from inside it. Such a surface can also be created by a diameter level, at which, however, the external diameter of the pusher sleeve is formed so as to taper from the fluid connection side to the end face of the plunger. Such a surface generates an axial force that pulls the pusher sleeve down from the seat surface of the plunger.

The surface areas of all such surfaces, and thus, preferably, of all inner and outer diameter levels of the pusher sleeves are preferably sized such that the axial forces at least substantially, or even completely cancel each other out when summed.

Preferably, the connection passage can connect an external annular space adjacent the pusher sleeve on the outside with the inside of the pusher sleeve and/or the passage of the plunger, whereby the external annular space is between the pusher sleeve and the housing or between the pusher sleeve and an insert in the housing.

Especially preferably, the external annular space can be sized such that it forms a reservoir accepting hydraulic fluid moved from the inside of the pusher sleeve when moved, in particular in which the increase in the volume of the annular space caused during moving corresponds to a decrease in the inner volume of the pusher sleeve. The result of this is, on the one hand, that all static axial forces generated by the hydraulic fluid are compensated, and, on the other, movement of the pusher sleeve into the housing during coupling does not require hydraulic fluid to be pressed out of the socket, as its interior remains constant, and the hydraulic fluid is merely moved within the socket.

The absence of axial forces can also be achieved with another embodiment, in which, axially inward and outward of the at least one opening, the pusher sleeve 13 and the plunger are securely positioned on top of one another on equal seal diameters. This automatically ensures that the axial forces in both axial directions are equal, and thus always exactly cancel each other out.

In such an embodiment, it can also be provided that in one area near the end face, the plunger on the outside and the pusher sleeve on the inside are configured cylindrically, in particular with substantially the same diameter, such that the at least one opening is axially opposite the inner wall of the pusher sleeve without any distance or at least without any significant distance between them.

"No significant distance" here means that a minimum, technically necessary distance can be provided in order to ensure that the pusher sleeve can be moved on the plunger.

The above object is met by another aspect of the invention with a hydraulic coupling socket of the type described above, in that the plunger is fastened to an inner piston that is extends axially, preferably coaxially, in the housing, and can be moved axially together with it, whereby, starting in the decoupled position, the assembly of the plunger, inner piston, and pusher sleeve as a whole, in particular in a specific embodiment, can also be moved together with the retaining sleeve axially into the inside of the housing up to an end position in which a hydraulic coupling plug with can interlock with the hydraulic coupling socket via the latch elements, and whereby then, starting in this end position, first the assembly of the plunger, inner piston, and pusher sleeve can be moved back toward the plug up to a stop position, in which the pusher sleeve is axially fixed to a limit stop, for example a limit stop on the retaining sleeve or the housing, and, from this stop position, only the plunger and the inner piston can be moved further back toward the plug, until the fluid passage through the socket is open, for example as a result of the pusher sleeve being opened through the plunger. It can be provided that it is moved back to the extent that the end face of the plunger, which is movable together with the inner piston, is in turn coplanar with the end face of the housing.

Both here and in other embodiments listed below, the fluid passage through the hydraulic coupling socket be formed by a passage in the pusher sleeve that can be opened and closed by the plunger, as is known from prior art. Alternatively, in the embodiments of the invention, it can also be provided that the fluid passage through the passage is formed with a discharge opening in the socket tapping, whereby the passage, in particular the opening, can be opened and closed by the pusher sleeve. In all embodiments, it is essential that the opening and closing of the fluid passage is carried out by a relative movement axially between the plunger and the pusher sleeve.

The "axis", with regard to which the individual parts can be moved in a parallel manner, preferably coaxially, is understood to refer to the longitudinal axis of the hydraulic coupling socket, thus in particular the middle direction of the flow of fluid between the socket and the plug.

The hydraulic coupling socket according to the invention has the particular advantage compared to the hydraulic coupling socket known from the prior art that the plunger now is no longer rigidly mounted in the housing, but rather can be moved axially relative to the housing forward and backward together with an inner piston in the housing, on which this plunger is fixed, in particular while the fluid passage remains closed by the hydraulic coupling socket, as the plunger and the pusher sleeve are moved simultaneously, and thus in a stable position with respect to one another.

In a possible embodiment of the invention, it can be provided in this regard that the inner piston is/can be biased by hydraulic fluid in at least one control compartment, which is at least partially delimited by an end face of the inner piston. This means that a change in the pressure in the control compartment can change a force axially acting on the inner piston.

If the at least one control compartment is delimited by an end face of the inner piston toward a hydraulic coupling plug, this means that the pressurization of the control compartment with hydraulic fluid generates a force acting on the inner piston toward the hydraulic coupling plug. If, on the other hand, the control compartment is depressurized or negative pressure is generated therein, the inner piston can be moved with the plunger and the pusher sleeve into the housing.

This can be aided by the inner piston being subject to an additional mechanically applied force toward the hydraulic fluid connection, for example by a compression spring supported between a contact area and the housing. In a possible alternative, such a compression spring can be mounted within the housing or, in another alternative, outside around the housing and/or around the inner piston.

The direction of the force of this spring is thus axial, and orientated such that the action of this force reduces the volume of the control compartment. This orientation has the advantage that the pressurization of the control compartment with hydraulic fluid can generate very substantial forces in order to move the plunger into a plug interlocking with the socket, and its plunger is pressed against any existing force into the plug, thus opening its fluid passage.

Of course, the orientation between the control compartment and the end face, as well as the spring, can be reversed. Then, pressurization causes the inner piston to be moved with the plunger and the pusher sleeve into the housing.

Preferably, here, the at least one control compartment can annularly surround the inner piston, and be delimited by the inner piston and the housing. To this end, the inner piston can be securely attached to the inner wall of the housing, movable with the inclusion of the annular space between walls of these parts that face each other.

The control compartment comprises a connection to a control line, with which hydraulic fluid is conducted to the control compartment in order to pressurize or depressurize it, as required. In a possible embodiment, the inner piston may comprise such a hydraulic fluid control line opening into the control compartment. This control line can be arranged, at least to a great extent, parallel to the main direction of movement of the hydraulic fluid to be conducted, in particular axially.

In a preferred embodiment, the inner piston can project movably from the housing on a side facing away from the hydraulic coupling plug and have a connection for the hydraulic fluid to be conducted. This connection can be connected with the inside of the pusher sleeve through the inside of the pusher sleeve, or with a passage in the plunger, but in any case with the fluid passage.

In an embodiment with an externally located compression spring acting between the inner piston and the housing, one end of the compression spring can be fixed to a limit stop on the inner piston, i.e. on the part projecting out of the housing, whereas on the other hand, the other side of the compression spring is fastened to a plug-side area of the housing.

If, therefore, such a hydraulic coupling socket according to the invention is fastened with the hydraulic fluid connection of the inner piston projecting out of the housing to a fluid supply, for example a hydraulic pump or work machine, the inner piston is locally fixed to the fluid supply, such that the above-described relative movement of the inner piston into the housing means in this case that the housing is moved on the inner piston toward a plug to be coupled, which, in particular, occurs by depressurizing the control compartment and the acting compression spring.

This results in an optical extension of the hydraulic coupling socket, such that an operator visually recognizes that the socket is ready for coupling. It is also recognizable based on the end face level of the hydraulic coupling socket that the end face of the plunger is in the housing, thus opening a circular opening on this above-described level.

Now, a hydraulic coupling plug can be inserted into the socket; to this end, in this embodiment, the hydraulic coupling plug must only press back the retaining sleeve provided for the latch elements against their spring force actuation until the latch elements engage with the ring groove on the plug. This can also be done with manually generated force.

At this moment, as with all embodiments of the invention, it can be provided that a movable security sleeve applied to the plug moves over the latch elements and secures them in place, such that the plug cannot be pulled back out.

By pressurizing the control compartment, then, a relative movement between the inner piston and the housing can occur, in which, with reference to the housing, the plunger moved with the inner piston is moved toward the plug, or, with reference to the fixed inner piston, the housing is moved toward the fluid connection, thus visually pulling the plug in this direction. As a result, the plunger presses the plunger into the inside of the plug, and the fluid passage through the socket and the plug is opened. s In another embodiment, it can also be provided that, based on simultaneous coaxial movability of the above-described retaining sleeve and the pusher sleeve, as well as the additional axis-parallel, preferably coaxial movability of the plunger and the inner piston, a hydraulic coupling plug can now be introduced, preferably manually, during coupling axially into the housing, without the plunger moving the plunger axially against the internal pressure of the plug, as is the case with the prior art. In this embodiment, unlike the above-described hydraulically initiated, spring force-supported movement, movement of the overall assembly of the inner piston, plunger, pusher sleeve, and retaining sleeve is carried out simultaneously by inserting the hydraulic coupling plug into the socket, in particular manually.

Here, the internal pressure or an axial force actuation by a spring holds the plunger of the hydraulic coupling plug in its initial position, in which its end face lies on the same plane as the outer end face of the housing, which annularly surrounds the plunger.

The tight arrangement thus maintained of the hydraulic coupling plug thus moves unchanged into the housing during coupling, moving the above-described overall assembly of the movable plunger, inner piston mounted thereon, pusher sleeve, and retaining sleeve simultaneously, such that their fluid passage also remains closed in the hydraulic coupling socket.

In the plunger according to the invention, preferably no internal pressure must be overcome. The pressure in the housing can even remain unchanged. This is possible, for example by moving the internal parts of the socket and the hydraulic fluid volume without any per se volume change.

In this embodiment, it can also be provided that fluid within the socket, against which the inner piston works, for example when moving it out of the socket, is pressed out of the socket, or, alternatively, is relocated within the socket.

Insertion of the hydraulic coupling plug can also take place completely in this embodiment of the hydraulic coupling socket according to the invention without influencing the position of the individual parts of the plug, until the retaining sleeve is moved together with the entirety of the other parts so far axially into the socket that the latch elements that have thus far been held back can engage with a ring groove on the surface of the housing, as already known from prior art and described above.

As with all embodiments, here, too, a sliding sleeve outside on the housing can additionally secure this retracted position of the latch elements, for example balls, which can occur, for example in that the retaining sleeve automatically, due to biasing, for example spring pretensioning, in the moment of the radial movement of the latch elements axially, moves over them, thus preventing radial deviation of the latch elements and ensuring that the coupling plug sits securely in the plug.

Up until this position, according to the invention, as with the embodiments described above, both the fluid passage in the socket and the fluid passage in the plug remain closed; accordingly, there is no risk of leakage.

By completely inserting the plug into the above-described embodiments of the hydraulic coupling socket according to the invention, therefore, the overall assembly of the above-described parts within the socket reaches an end position, from which the assembly of the plunger, inner piston, and pusher sleeve can be moved back toward the plug.

It can be moved back, for example by the application of fluid pressure exerting force on this assembly of the above-described parts, acting axially toward the plug, and thus moving the plunger, inner piston, and pusher sleeve into this direction, as was described in the previous embodiment.

It can be provided that the force generated by the application of pressure acts directly on the inner piston and thus on the plunger, moving both of these parts axially relative to the housing, whereby the pusher sleeve is supported by the plunger or, preferably, the inner piston via a compression spring, which presses it against the seat surface on the plunger, and therefore is moved together with it axially to the plug, as is the case with the above-described embodiment. In this embodiment, the hydraulic fluid connection can be provided directly on the housing, such that this housing is in a fixed position with respect to a hydraulic fluid connection, and the inner piston only moves within the housing.

The retaining sleeve remains in the end position it originally reached, as this position is axially fixed by the interaction with the end face of the external housing.

Because the backward movement of the assembly of the plunger, inner piston, and pusher sleeve initially maintains the seal between the plunger and the pusher sleeve, in particular the outer free end of the pusher sleeve and the sealing area facing away from the outer of the plunger remain interlocked with one another, for example by the above-described biasing of the pusher sleeve axially toward the seat surface, it is ensured in all embodiments that there is no fluid permeation in the path of movement, up to an end position, in which the pusher sleeve is axially fixed to a limit stop, for example of the retaining sleeve or the housing.

In all embodiments, in this movement of the assembly of the inner piston, plunger, and the pusher sleeve fixed securely to them, the application of the end face of the plunger to the equal end face of its plunger moves the plunger the same distance axially into the coupling plug, such that the fluid passage is opened on the plug side. The force acting against this movement of the plunger can be entirely supplied by the inner application of force of the assembly of the inner piston, plunger, and pusher sleeve, such that, in the device according to the invention, this force need no longer be supplied manually by the operator, but instead is supplied mechanically by the fluid pressure.

Accordingly, with the above-described embodiments of the socket according to the invention, it is possible to open even hydraulic coupling plugs that are completely pressurized after they have latched to a coupling socket according to the invention automatically and mechanically by fluid control of the plunger.

In all embodiments described here, according to the invention, when moving back the assembly of the inner piston, plunger, and pusher sleeve toward the plug and simultaneously moving the plunger, the pusher sleeve is moved on its path up to a stop position at which the pusher sleeve is axially fixed. This limit stop can be formed, for example between the pusher sleeve and the retaining sleeve, or between the pusher sleeve and the housing.

Accordingly, starting at this stop position, in all embodiments, because the pusher sleeve has reached its stop position, any further application of force to the inner piston or the plunger mounted thereon, merely causes the inner piston with the plunger to continue moving axially toward the plug, such that the relative movement toward the now-fixed pusher sleeve causes the fluid passage in the hydraulic coupling socket to open, for example by separating or opening a preferably radial opening of a passage in the plunger by the pusher sleeve. The full passage for the hydraulic fluid through the socket and the plug is thus formed.

In a more fully elaborated variant, it can be provided that force is applied directly to the inner piston on which the plunger is fixed by the hydraulic fluid to be conducted through the hydraulic coupling socket. In this case, if, thus, a hydraulic coupling plug is interlocked with the socket according to the invention, impinging upon the socket with the fluid to be conducted or the control compartment referred to in the previous embodiment, for example by turning on a source of hydraulic pressure/a supply unit, the interior of the hydraulic coupling socket or the control compartment can be pressurized, such that this causes the inner piston to be moved relatively to the housing due to the force. In this way, the hydraulic coupling plug and the socket are opened by the operating pressure of the overall system.

For this embodiment, thus, it suffices for the inner piston inside the housing to be movably positioned axially, preferably coaxially, and the inside thus forms a pressurizable control compartment, through which the piston can be repositioned axially, due to the volume filled by the hydraulic fluid to be conducted. In this case, the housing of the hydraulic coupling socket according to the invention forms a cylinder housing allocated to the inner piston.

In another embodiment, it can also be provided that the inner piston is movable axially, preferably coaxially, in an insert mounted in the housing, which insert is surrounded by the hydraulic fluid to be conducted through the hydraulic coupling socket, whereby a control compartment delimited by the inner piston, in particular on the plug side, is formed in the insert, which control compartment has a separate fluid supply and drainage.

In this embodiment, thus, the control compartment in the insert is separate from the interior of the housing (as is also the case with the annular control compartment described in the above-described embodiment), such that the hydraulic fluid to be conducted through the socket surrounds the insert, in particular annularly. In this regard, a preferred embodiment can even provide that the pusher sleeve, which is subjected on the outside to the flow of the hydraulic fluid to be conducted, has walls with fluid passages, for example radial fluid passages, by means of which the hydraulic fluid surrounding the insert, which is to be conducted through the socket, can be conducted into the pusher sleeve.

The above-described embodiment of a separate insert has the advantage that the control compartment delimited by the insert and the inner piston can be separately, i.e. independently of the force acting inside the socket according to the invention, depressurized or pressurized, as is also the case with the embodiment described initially with the annular control compartment. This means likewise that a pressurized socket according to the invention can be used without difficulty in order to couple a plug within it, as the hydraulic fluid only exerts force on the pusher sleeve in the radial direction within the socket according to the invention, and accordingly generates no forces counteracting axial movement.

By moving the assembly of the inner piston, plunger, pusher sleeve, and, if applicable, the retaining sleeve, on the other hand, in the embodiments with separate control compartments, the control compartment contents are compressed, whereby, however, the fluid contained within it can be conducted via a line to the outside of the control compartment, such that this depressurizes the control compartment and the above-described assembly of parts can be moved without the socket according to the invention having to be disconnected from the entire hydraulic system.

There is the additional advantage that, after coupling the plug and the socket, the force to move the inner piston together with the plunger and the pusher sleeve can now be exerted directly by pressurizing this respective above-described control compartment, to which end an appropriate hydraulic fluid can be conducted into this separate control compartment, either that of the insert or the annular control compartment of the previous embodiment, through a line, in particular the same above-described line. To this end, in a possible embodiment, the pressurized hydraulic fluid made available from the hydraulic system as a whole for the operation of, for example a work machine can be used.

In another, additional alternative embodiment, it can also be provided that the inner piston on which the plunger is fixed separates two control compartments from one another, whereby a movement of the inner piston effects a volume increase of the one and a volume decrease of the other control compartment respectively. The degree of the volume increase and decrease is preferably identical.

In this embodiment of the invention, thus, it is possible to provide an assembly such that, in the original decoupled position, the socket according to the invention takes a position of the assembly of the parts (inner piston, plunger, pusher sleeve, and preferably also the retaining sleeve), in which one of the control compartments, in particular the one facing the plug side, has its volume minimized, whereas the second control compartment, in particular the one facing the fluid supply side, has its maximum volume.

The result of this is that, after moving this above-described overall assembly (whether this movement is manually or hydraulically initiated) and subsequently changing the volume ratios by pressurizing the control compartment facing the fluid connection side, the inner piston with the plunger fixed thereto can once again be moved completely back into the original position that these two parts had in the decoupled position.

In terms of design, the arrangement of two control compartments can be achieved, for example by providing an annular room between a sleeve-shaped, in particular hollow, inner piston and the inner wall of the housing, which thus surrounds the inner piston coaxially, and which is subdivided by an annular ridge on the outside surface of the inner piston into the two axially separated control compartments. Thus, the two axial end faces of the ridge form end faces, each delimiting one of the control compartments. In order to ensure a watertight subdivision of the annular space into the two control compartments, it can be provided that the annular ridge is securely fastened in the radial direction to the inner wall of the housing, for example in that the annular ridge has a ring groove in which an O-ring is positioned.

In this embodiment, the above-described assembly of the inner piston, plunger, pusher sleeve, and preferably also the retaining sleeve can be moved manually, whereby hydraulic fluid is displaced from one of the two control compartments, and hydraulic fluid, in particular the displaced hydraulic fluid, flows into the other. Movement can also be made in an automated manner if one of the control compartments is pressurized by hydraulic fluid and the other is depressurized. In the automated movement, the retaining sleeve is not part of the assembly being moved; rather, it remains due to the spring biasing in the original position until the hydraulic coupling plug is inserted.

In a preferred embodiment, it can be provided that the control compartment whose volume is increased when the inner piston is moved, in particular during insertion of a hydraulic coupling plug into the hydraulic coupling socket, thus in particular the control compartment in the previous embodiment that faces the plug side, is connected with the interior of the hydraulic coupling socket through which the hydraulic fluid is conducted through the socket to the plug.

This connection between the control compartment and the inner volume of the hydraulic coupling socket can be made by an internal, passage-like connection in its housing, or by an external line.

This makes it possible for a pressure balance to be reached in the control compartment when its volume increases due to the axial movement of the assembly of the above-described parts, in particular when the plug is inserted. Hydraulic fluid can flow thus out of the interior of the socket into the ever bigger control compartment.

In a preferred further elaboration of the invention, it can be provided that the control compartment whose volume decreases when the inner piston is moved, in particular during insertion of a hydraulic coupling plug into the hydraulic coupling socket, i.e. in particular the control compartment facing the connection side of the hydraulic coupling socket, has a connection that can be/is optionally connected with a drainage line receiving displaced hydraulic fluid, such as a low-pressure accumulator or a low-pressure line, or can optionally be connected with a supply port to feed hydraulic fluid into the control compartment, for example from a high-pressure accumulator or high-pressure line.

Thus, this embodiment can first ensure that, when a plug is inserted into the socket according to the invention, and this control compartment is then reduced inside, the volume of the hydraulic fluid displaced during this process is drained outside the socket. The fluid can be drained, for example into the tank provided in the overall hydraulic system, or a separate low-pressure accumulator or a low-pressure line.

In this regard, a "low-pressure accumulator" refers to an accumulator, i.e. a container for hydraulic fluid, having a hydraulic pressure lower than the pressure in the control compartment and/or the overall system, i.e. in particular the interior of the socket. The same applies to a low-pressure line.

The optional connectability with a supply port to drain hydraulic fluid has the additional advantage that, when a hydraulic coupling plug is completely inserted into the socket according to the invention and secured therein, hydraulic fluid can then be conducted into this control compartment via the same connection. The supply can be effected, for example with a hydraulic pump also conducting the hydraulic fluid through the plug and the socket, but also by a separate high-pressure accumulator or a separate high-pressure line.

In this regard, "high-pressure accumulator" refers to a hydraulic fluid reservoir under sufficient pressure that it allows fluid to be conducted into the control compartment. The same applies to a high-pressure line.

This line causes the inner piston and the plunger to be moved axially together with the pusher sleeve due to the forces being exerted, as described above, thus opening first the plug and then the socket, whereby, depending on design, it can be provided that the socket and the plug are opened simultaneously or in the reverse order.

In another variant, a socket assembly can also be provided that has two or more sockets according to the invention, of the type described above, with two or the appropriate number of control compartments, respectively, as well as a joint accumulator for receiving and a joint accumulator for supplying fluid, for example the above-described low- and high-pressure accumulators, whereby each of the accumulators can be optionally connected simultaneously with the control compartments of both sockets via a valve, whose volume sockets decreases when the inner piston is moved during insertion of a hydraulic coupling plug into the hydraulic coupling socket.

This assembly has the advantage that the above-described hydraulic interconnection allows for simultaneous or sequential coupling of two or more plugs to two or an appropriate number of sockets according to the invention, as is customary in the operation of work machines. Customarily, a connection of a socket and a plug is provided in order to conduct pressurized hydraulic fluid from a pump assembly or a hydraulic high-pressure generator of any kind to a work machine, whereas, on the other hand, the hydraulic fluid is returned to a recovery tank after releasing the energy in the work machine via a coupling comprising a second socket according to the invention together with a plug.

Advantageously, in the above-described assembly, together with the accumulators, simultaneous coupling of both sockets according to the invention is achieved, as described above, whereby the fluid displaced from the supply-side control compartment is drained into the above-described accumulator, for example a "low-pressure accumulator" when both plugs are simultaneously inserted.

After the coupling of both plugs with both sockets according to the invention, the pressurization of the above-described control compartment on the connection side can cause the retraction of the inner piston, plunger, and pusher sleeve of both sockets according to the invention, either simultaneously or sequentially, in the manner described above.

In a preferred elaboration of such an assembly of sockets according to the invention, it can be provided that this assembly has a hydraulic assembly, for example a shuttle valve with two input sides and one output side, with which the higher-pressure input side can be connected with the output side, and which is connected with the output side in particular via a check valve with the accumulator for fluid discharge, in particular in the high-pressure accumulator, and each of which is connected at one of the two input sides with the interior of a respective one of the two sockets.

This embodiment has the special advantage that the high-pressure accumulator, which is emptied by moving the plunger(s) in order to open the socket and the plug, can be repressurized with pressurized fluid, as at least one of the two sockets according to the invention can be used on the high-pressure side, and accordingly, the interior of this high-pressure-sided socket is always connected with the hydraulic accumulator via the shuttle valve, such that, when a hydraulic system is being operated, for example any type of work machine, the high-pressure accumulator is automatically repressurized in order to assist a future coupling.

Alternatively, of course, in a socket assembly consisting of two or more sockets according to the invention, it can be provided that both control compartments on the connection side, i.e. which decrease in volume during coupling, are directly pressurized by the pressure in the hydraulic line with which the fluid is conducted through the sockets to the plugs. This automatically opens the socket and the plug when the hydraulic system is put into operation, i.e. is pressurized.

In such a socket assembly with two accumulators, it can be additionally provided that the assembly has a parallel connection of two check valves whose input sides are jointly connected with the accumulator for receiving fluid, in particular the low-pressure accumulator, and which is connected via each of the two output sides with the interior of a respective one of the two sockets.

According to the invention, this has the result that an accumulator that is pressurized when the plugs are inserted is depressurized for future pressurizing processes, for example is emptied of accumulated hydraulic fluid, as the parallel connection of the two check valves ensures that this low-pressure accumulator is always depressurized toward the socket the interior of which has the lower pressure of the two sockets of this assembly according to the invention.

In a preferred elaboration, it can also be provided that the two sockets and the accumulator, i.e. in particular the high- and low-pressure accumulator, as well as the other hydraulic parts such as the above-described shuttle valve assembly and the check valves of the above-described parallel connection, in an especially preferred embodiment, are all integrated into a single physical unit. Such a unit can thus comprise all valves required, with which the high- and low-pressure accumulators can be optionally connected to at least one of the two control compartments, specifically the control compartment that decreases in volume when plugs are inserted into the socket.

BRIEF DESCRIPTION OF THE DRAWING

Embodiments of the invention are described below. In the drawings.

SPECIFIC DESCRIPTION OF THE INVENTION

Figure 1:
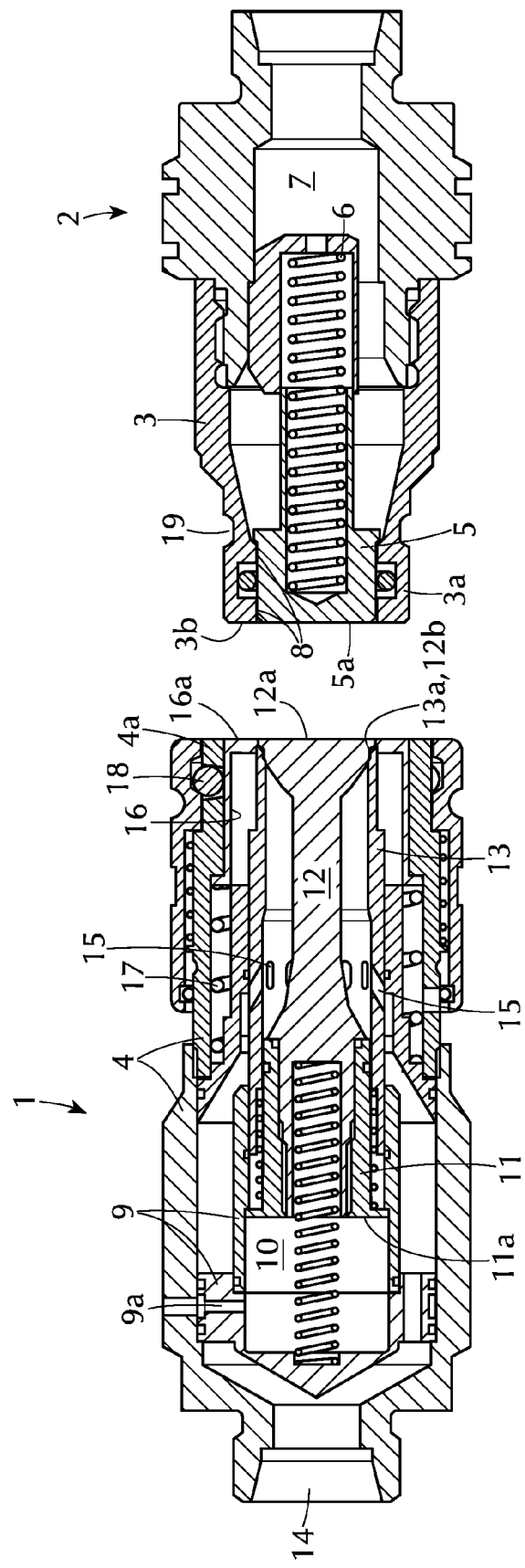
FIGS. 1, 2, and 3 show a first embodiment during the coupling process in chronological order.
Figure 2:
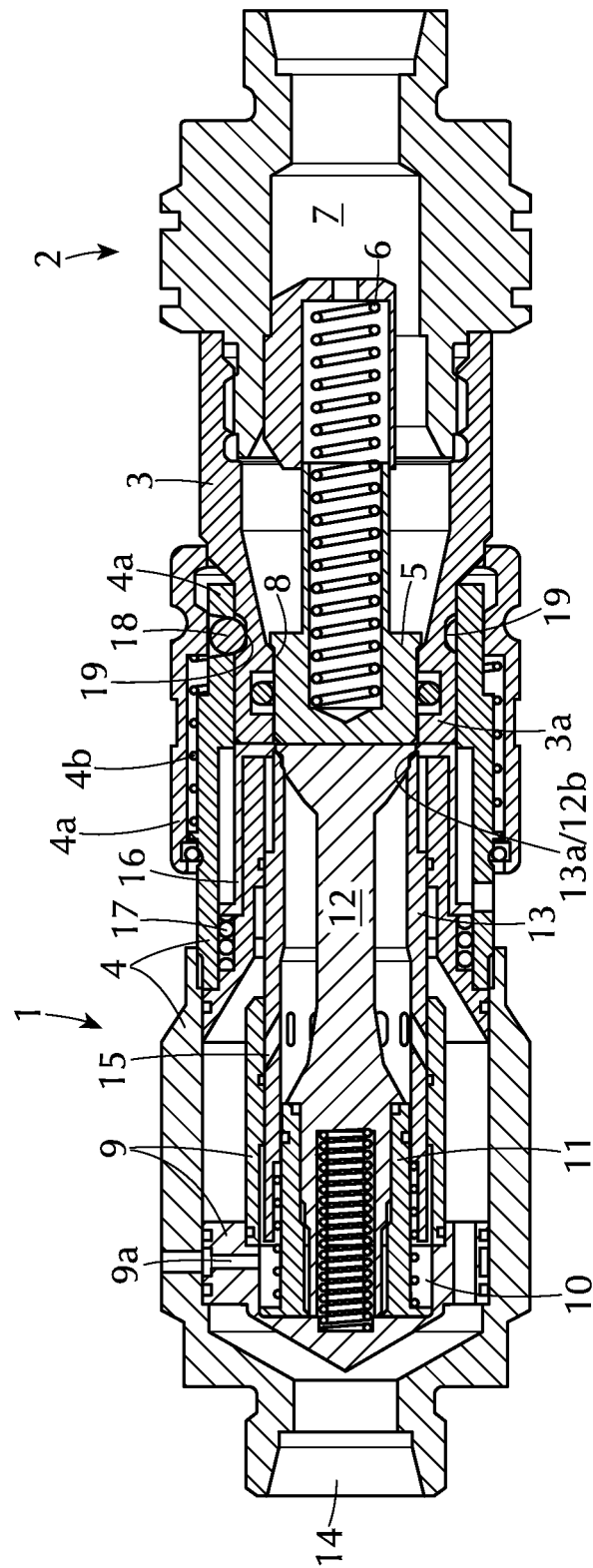
Figure 3:
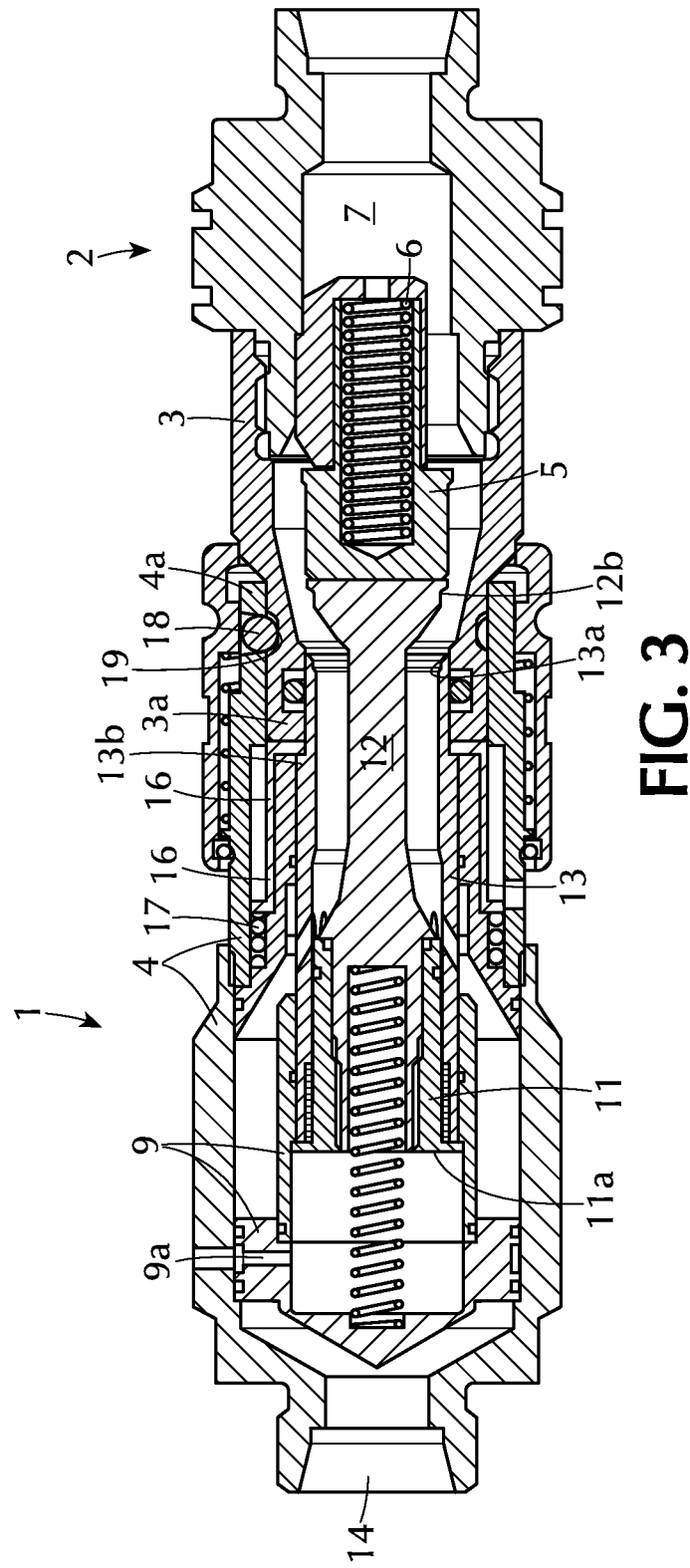

FIGS. 1-3, described together below, show various steps of a coupling process between a hydraulic coupling socket 1 according to the invention and a prior-art hydraulic coupling plug 2. The hydraulic coupling plug 2 has a housing 3 whose cylindrical outer end 3a can be inserted into a socket housing 4 or its outer end 4a. The plug 2 here has a plunger 5 surrounded annularly by the outer end 3a of the plug housing, subject to an axial biasing force, here by a compression spring 6, that urges it outward toward the socket 1. In addition to the force exerted by the spring 6, hydraulic pressure in the interior 7 of the plug 2 is effective on the plunger 5 to hermetically sealing the inner passage 8 of the plug. The hydraulic coupling plug 2 described here essentially corresponds to the prior art.

The hydraulic coupling socket 1, on the other hand, is a further development, in which in this embodiment an insert 9 inside the socket 1 has a control compartment 10 axially outwardly closed toward the plug by a rear end face 11a of an inner piston 11 that in this embodiment is coaxially centered in the socket housing. The inner piston 11 is fixed to a plunger 12 extending toward the plug 2 and coaxially centered in the housing 1. This plunger 12 has an large-diameter region on its (here to the right) outer end, whose end face 12a facing the plug is equal in surface area to an end face 5a of the plunger 5. Accordingly, during insertion of the plug into the socket according to the invention, these end faces 5a and 12a abut one another.

A pusher sleeve 13 engages coaxially around the plunger 12 and has an annular rim 13a that is directed toward the plug and is sealed against a rim surface 12b on the side facing away from the end face 12a of the plunger, such that the interior of the pusher sleeve 13 is outwardly closed by the plunger 12 toward the plug.

Here, the insert 9 is annularly surrounded by hydraulic fluid fed into the socket on the connection side by a supply port 14, this hydraulic fluid being conducted inside the socket by at least partially radially extending holes 15 from outside through the wall of the pusher sleeve 13. Due to the hermetic seal between the outer end 13a of the pusher sleeve 13 and the rear sealing surface 12b of the plunger 12, the hydraulic fluid cannot, however, exit the socket.

It can also be seen that both the plunger 12 and the pusher sleeve 13 are surrounded here by a retaining sleeve 16 coaxial to these parts and having an annular end face 16a complementary to the annular outer end face 3b of the hydraulic coupling plug 2. When inserting the plug into the socket, thus, the end face 3b comes into contact with the end face 16a of the retaining sleeve 16, and is pushed into the housing 4 by axial movement of the plug into the socket according to the invention against the force of a compression spring 17.

Simultaneously, in this embodiment of the socket according to the invention, the retaining sleeve 16, the plunger 12 and the adjacent pusher sleeve 13 on its left are moved inward such that, in this embodiment, the assembly of the plunger 12, the inner piston 11, the pusher sleeve 13, and the retaining sleeve 16 is moved axially without any relative movement between the plunger 5 and its housing 3. During the entire insertion process of the plug into the socket according to the invention, the relative position of the plunger 5 and the housing 3 is initially maintained, and the plug is thus completely sealed.

The position in which the plug 2 is fully inserted into the socket 1 according to the invention is shown in FIG. 2. Here, it can be seen that the interior of the control compartment 10 was reduced during insertion, whereby the fluid displaced can be displaced through the connection 9a from the control compartment 10 in this embodiment. It can be displaced, for example into a recovery tank or a pressure accumulator.

FIG. 2 shows that, in the end position of maximum movement of the assembly of the plunger 12, the inner piston 11, the pusher sleeve 13, and the retaining sleeve 16, the plug 2 can lock in the socket 1, as the retaining sleeve 16 no longer supports the latch balls 18 so they can engage radially in an annular groove 19 on the outer surface of the outer end 3a of the housing. An outer sliding latch sleeve 4a belonging to the housing, which is biased by a compression spring 4b toward the plug, automatically maintains the positions of the latch balls 18 after radial retraction of the latch balls 18, such that the plug, which is still closed, is now securely locked to the socket.

By pressurizing the control compartment 10, for example using a hydraulic pump that also conducts the hydraulic fluid through the socket and the plug, or by a separate pressure generator such as a high-pressure accumulator, fluid is supplied to the control compartment through the same connection 9a through which the fluid was previously displaced, thus urging the assembly of the inner piston 11, the plunger 12, and the pusher sleeve 13 outward toward the plug, and pushing the plunger 5 axially back into the plug 2.

The pusher sleeve 13 moves axially toward the plug until it hits with a stop 13a on the retaining sleeve 16, and is thus axially fixed. The pressurization or biasing from the control compartment 10 can thus only cause further movement of the plunger 12, causing its sealing area 12b to separate from the open outer end 13a of the pusher sleeve, thus opening the fluid passage between the socket and the plug.

The description of FIGS. 1-3 makes clear that the plug and the socket can be coupled even if the plug is completely pressurized, as, unlike the prior art, coupling does not require the plug plunger 5 to move axially. According to the invention, this only occurs when the plug is securely locked in the socket, and the movable socket plunger, together with the inner piston on which it is fixed then move due to pressurization of the socket, in particular in a control compartment effective on the inner socket plunger such that the inner piston is moved axially toward the plug, the socket plunger activating both the plug and the socket.

Figure 4:
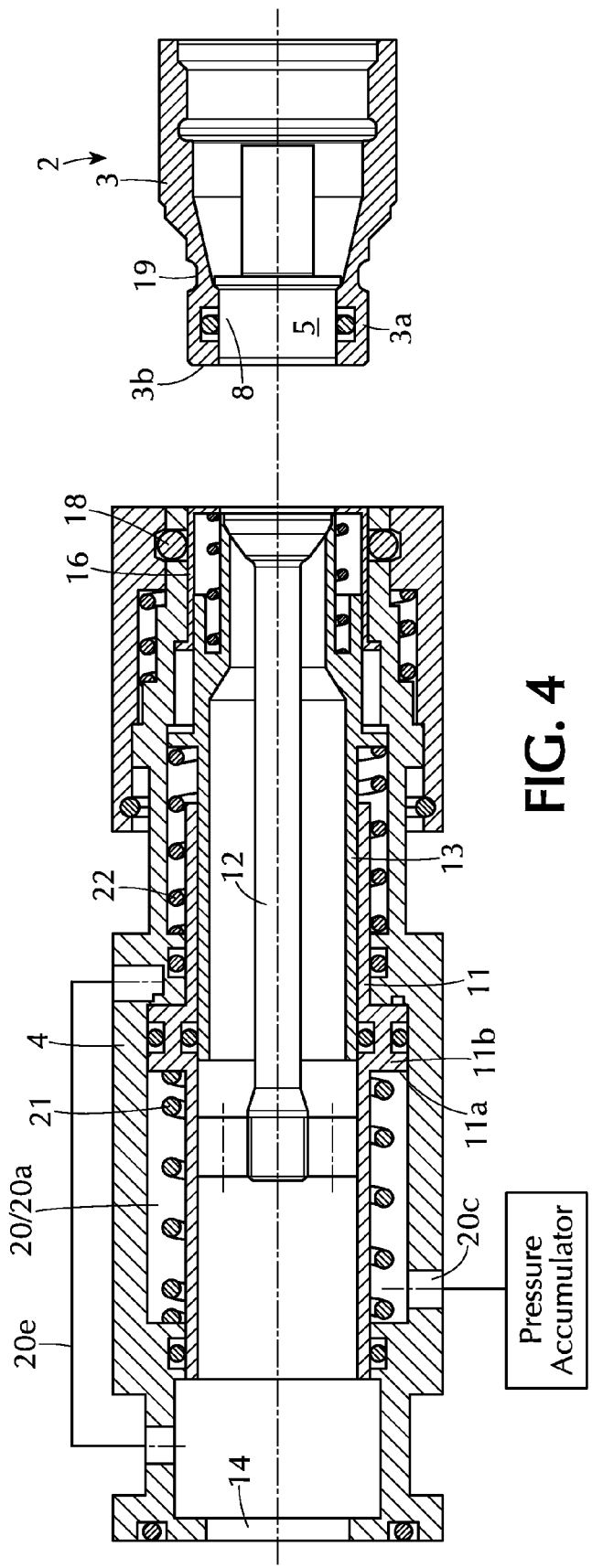
FIGS. 4, 5, and 6 show a second embodiment during the coupling process in chronological order.
Figure 5:
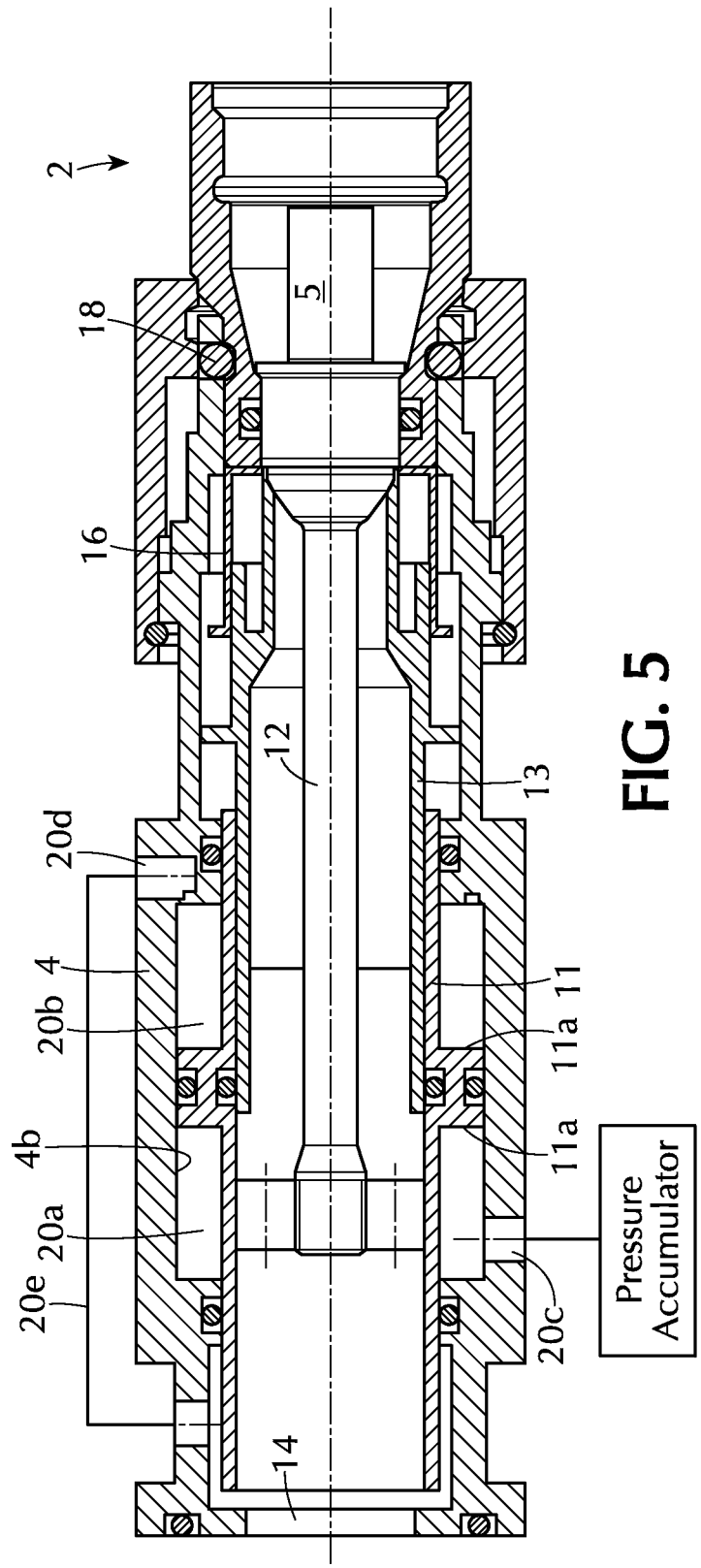
Figure 6:
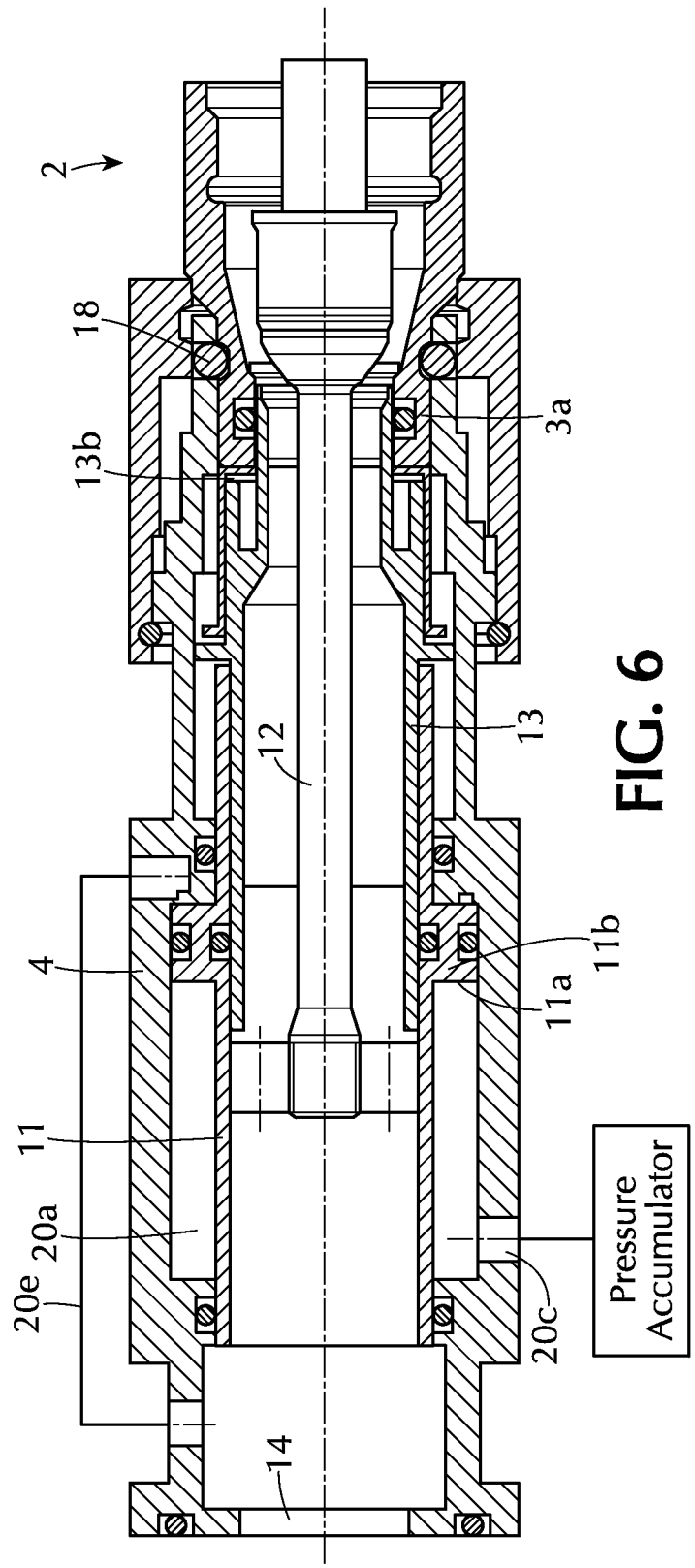

FIGS. 4-6 describe an alternative embodiment with parts that are, in themselves, the same, and have the same reference numbers, but here the inner piston 11 is formed as a hollow sleeve and is coaxially surrounded by an annular space 20. This annular space 20 is subdivided by a radially outwardly projecting annular ridge 11b on the outer surface of the sleeve-shaped piston 11 into a control compartment 20a, here axially to the left, and a control compartment 20b to the right, both of which coaxially and annularly surround the inner piston 11. Here, axial end faces 11a form respective end surfaces that delimit the inner supply-side control compartment 20a and the outer plug-side control compartment 20b.

As with the previous embodiment, the inner piston 11 here is biased outward by a compression spring 21 axially toward the plug, so that it assumes a maximum rightward axial position in the absence of other forces.

The ridge 11b here seals the two control compartments 20a and 20b from each other in that a groove is formed in its radial outer surface that contains an O-ring sealing the ridge 11b against an inner wall 4b of the housing 4.

In the embodiment described here, the pusher sleeve 13 is coaxially sealed in the inner piston 11, and, for its part, is subject to an axial biasing force toward the plug by a compression spring 22. Accordingly, hydraulic fluid is conducted directly through the hollow inner piston 11 into the pusher sleeve 13 from the supply port 14.

As with the previous embodiment, insertion of the plug 1 moves the assembly of the retaining sleeve 16, pusher sleeve 13, plunger 12, and inner piston 11 axially into the housing 4, reducing the volume of the control compartment 20a facing the port 14. A fluid connection 20c in this control compartment 20a allows the fluid displaced in this process to escape from the control compartment 20a and be supplied, for example to the hydraulic accumulator circuit or into a tank of the hydraulic system, or be drained off in another manner.

The increase in the volume of the plug-side control compartment 20b causes a pressure drop that is compensated for in that the control compartment 20b is connected via a connection 20d and an internal or external conduit 20e with the interior of the socket, in particular in the area of the supply port 14, such that, the volume displaced movement can flow into the control compartment 20b and that insertion of the hydraulic coupling plug into the socket does not lead to changes in relative pressure inside the socket.

After full insertion as shown in FIG. 5, the control compartment 20a is pressurized by hydraulic fluid by the connection 20c, such that the pressure on the annular end face 11a of the inner piston 11 moves it together with the plunger 12 and the pusher sleeve 13 outward toward the plug, and the plunger 5, as described above, is moved axially by the socket plunger into the plug 2, opening it.

As this happens, the pusher sleeve 13 reaches an outer end position with the retaining sleeve 16 on the limit stop 13b, such that, from this position, the pusher sleeve 13 is axially fixed, and only the plunger 12 continues to move toward the plug 2, thus opening the fluid passage between the pusher sleeve 13 and the plunger 12.

The hydraulic fluid conducted here into the control compartment 20a to move the inner piston 11, plunger 12, and the pusher sleeve 13 can, for example by drawn from a hydraulic pump that also serves to conduct the fluid to be conducted through the socket 1 and the plug 2. There is also the possibility of drawing this fluid from a pressure accumulator pressurized with hydraulic fluid under a specified pressure higher than the internal pressure of the control compartment, or, preferably, the internal pressure of the socket.

Referring to FIGS. 4-6, FIGS. 7-10 show a hydraulic connection of a socket assembly comprising two sockets according to the invention. Here, in a starting position shown in FIG. 7, a resting position of the hydraulic supply system is shown in which the control valve 23 is closed for both sockets, such that the interiors of the sockets are under a predetermined pressure. The connection can be used accordingly for the socket shown in FIGS. 1-3.

Figure 7:
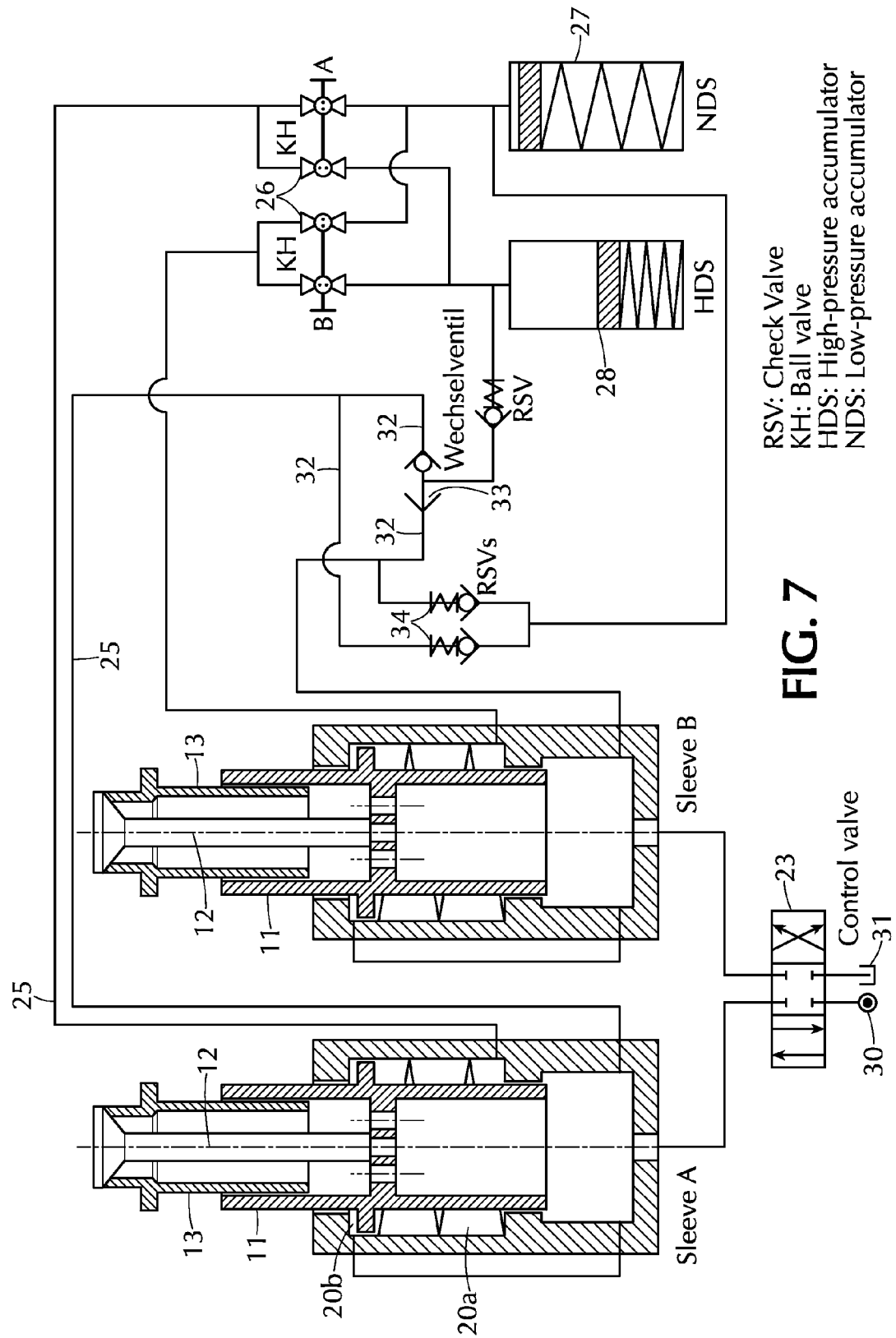
FIGS. 7-10 show the work cycles of an assembly according to the invention with two sockets and a hydraulic connection with high- and low-pressure accumulators.

Both sockets are shown in FIG. 7 in a decoupled position, in which the inner piston 11, the plunger 12, and the pusher sleeve 13 are in their position of maximum axial movement outward toward the plug, such that these sockets are closed. The supply-side control compartment 20a is of maximum volume here, while the plug-side control compartment 20b, on the other hand, is of minimum volume.

Figure 8:
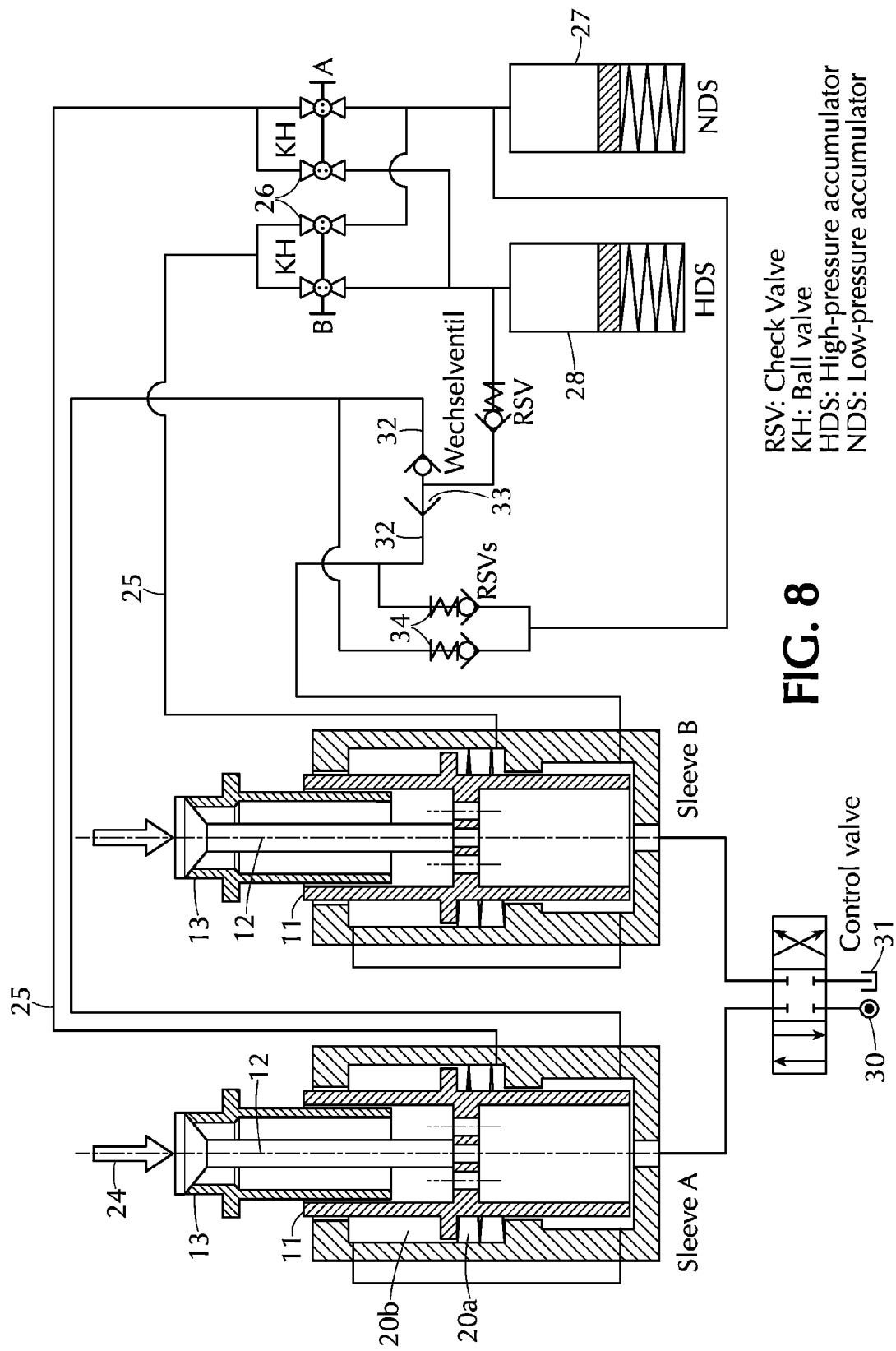

The arrow 24 in FIG. 8 represents insertion process, in which a plug (not shown here) is fitted into the socket, and the assembly of the sleeve (not shown), plunger 12, pusher sleeve 13, and inner piston 11 is initially moved axially inward toward the supply side, reducing the volume of the supply-side control compartment 20a. The fluid displaced during the volume reduction is pushed by the line 25 out of the control compartments 20a of both sockets via a switching valve assembly 26 into a low-pressure accumulator 27, which is pressurized with fluid this way, thus increasing its fluid volume.

In a two-socket assembly with the hydraulic connections shown here according to the invention, an operator must accordingly merely bring the switching valve assembly 26 into a position in which the low-pressure accumulator is connected with the control compartments 20a of both sockets in order to allow for insertion of a plug, which can be done with normal manual force, as the fluid must merely be manually displaced from the control compartment 20a.

Figure 9:
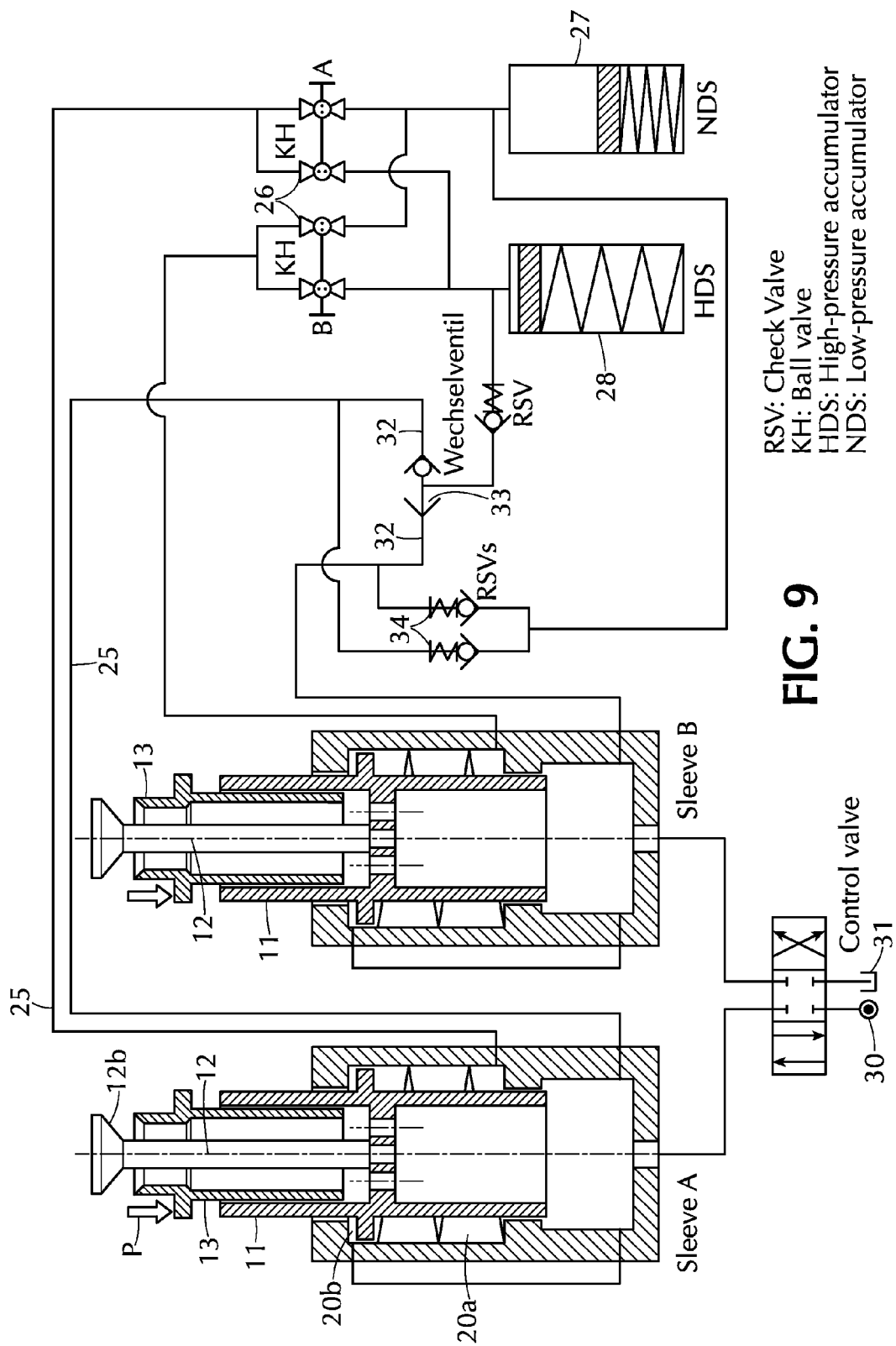
Figure 10:
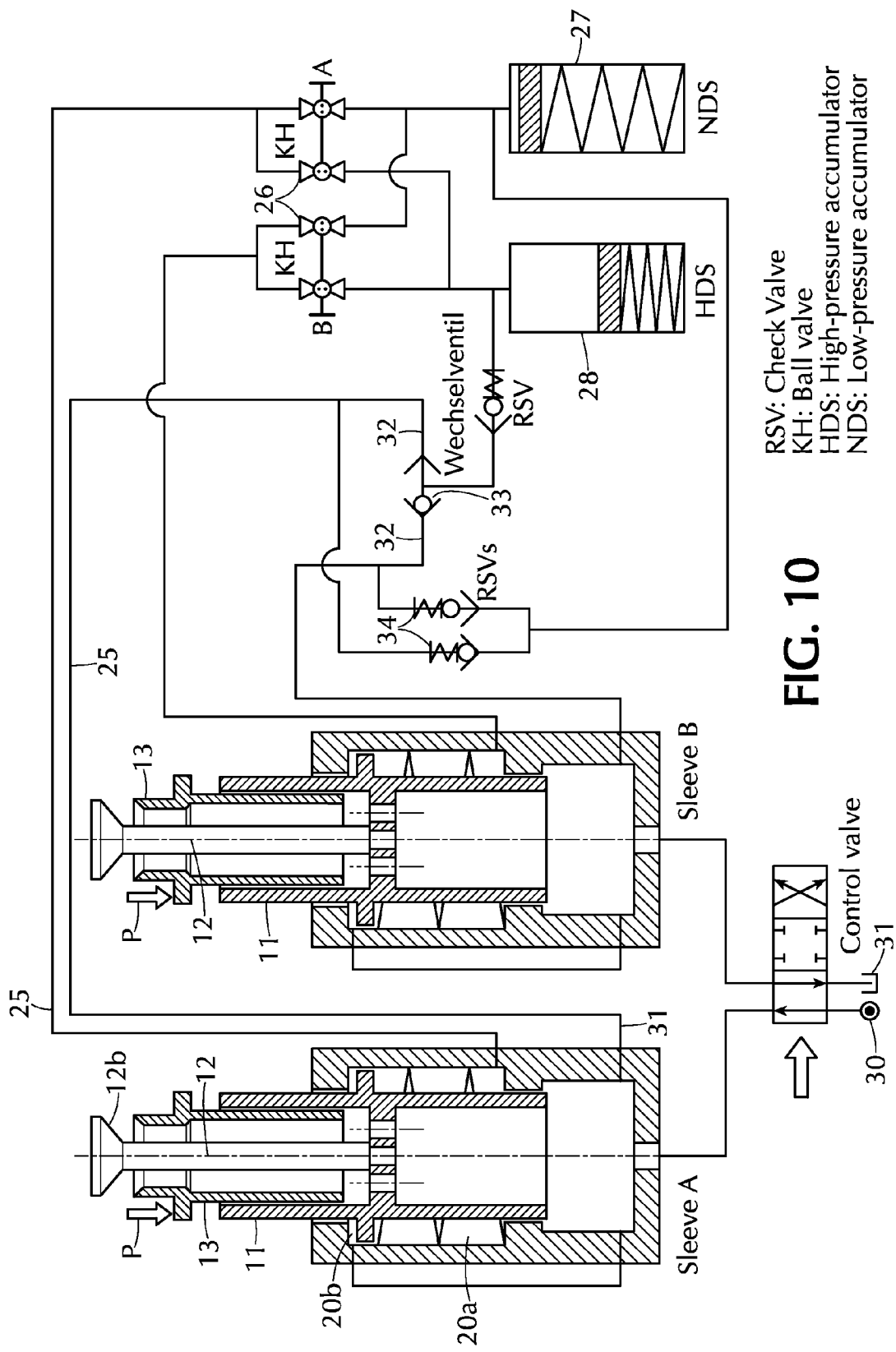

FIG. 9 shows the situation following insertion of the plug (not shown), in which the pressurized fluid of a high-pressure accumulator 28 is supplied to the control compartments 20a of both sockets after switching of the valve assembly 26 via the lines 25, such that the hydraulic biasing, as described above, moves the assembly of the inner piston 11, the pusher sleeve 13, and the plunger 12 outward toward the plug, until the pusher sleeve 13 reaches a limit stop either on the housing or on the retaining sleeve 16, and can no longer be moved axially (see arrow P). Further axial movement of the inner piston together with the plunger 12 thus causes its sealing surface 12b to separate from the pusher sleeve 13, opening the fluid passage to the plug.

In this position, the high-pressure accumulator 28 is completely depressurized due to discharge of its fluid into the control compartment 20a, whereas the low-pressure accumulator 27, on the other hand, is fully pressurized due to filling with fluid from this control compartment.

Thus, there must be a fluid transfer between both pressure accumulators so that they will be available for a subsequent coupling process in the same functional manner. According to the invention, this, too, is achieved with a hydraulic connection of the hydraulics shown in FIG. 7-10.

If, now, hydraulic actuation of a tool is done with the valve 23 of the timing chain, for which, in this example, the socket A is connected with the high-pressure side of a fluid source 30, and the socket B is connected with the low-pressure side, for example a tank 31, the interior of the socket A is kept under high pressure, and the interior of the socket B is kept under low pressure. The fluid pressures of the interiors of both sockets are applied through the lines 32 to a switching valve assembly 33, provided in order to feed the fluid of a line under high pressure of the two lines 32 to the high-pressure accumulator 28, thus completely pressurizing it. Due to the switching valve, it is irrelevant which of the two sockets A or B is operated under high or low pressure. In any case, the automatic adjustment of the switching valve, instead of which two check valves can also be used, causes appropriate pressurizing of the high-pressure accumulator.

The same lines 32 connect both sockets via a parallel assembly of two check valves 34 on the input side, the joint output side of both valves being connected to the low-pressure accumulator, such that its contents automatically pass into the interior of the socket under low pressure, here the socket B, such that the low-pressure accumulator can regain that pressure it lost during coupling, thus making it available for a later coupling process.

It should be noted for the embodiment described here that the use of high- and low-pressure accumulators is not mandatory for use according to the invention. It is also possible to drain the fluid volume from the control compartment A during coupling into the hydraulic supply tank, which is under low pressure, thus automatically connecting the fluid pressure generated hereby to the control compartment 20a and opening the socket and the plug when the hydraulic system is turned on.

This embodiment, too, shows that an operator can manually connect even a plug assembly that is under pressure with the socket according to the invention using manual force after activating the switching valves 26.

A third embodiment is shown in FIGS. 11-14. Here, too, the hydraulic coupling socket 1 works together with a hydraulic coupling plug 2, as described for FIG. 1 above. Parts matching the previous figures are identified with the same reference numbers.

Unlike the previous figures, here, the housing 4 consists of several individual parts 4a, 4b, and 4c that are connected with one another.

Figure 11:
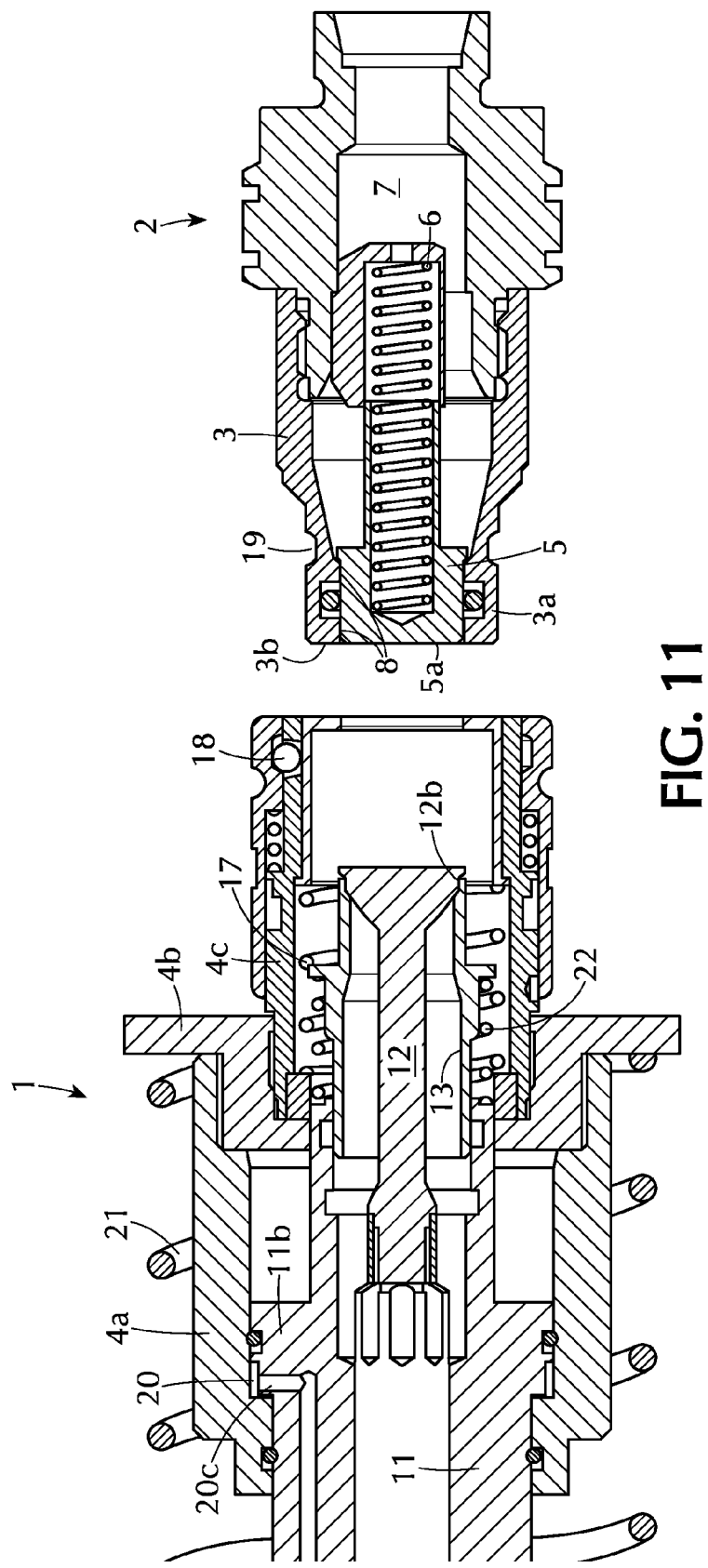
FIGS. 11-14 show a third embodiment during the coupling process in chronological order.

The axially movable inner piston 11 in the housing 4 is connected with the plunger 12 and is a hollow sleeve whose interior is pressurized by the hydraulic fluid to be conducted through the socket 1. The fluid connection here leads from the inside of the inner piston 11 into the pusher sleeve 13, which, in FIG. 11, is securely positioned on the plunger 12 at its seat 12b.

Unlike FIGS. 4-6, in which the fluid supply port 14 for the fluid to be conducted is on the housing 4, this assembly has a fluid connection—not shown in the figures—on the inner piston 11, which projects movably from the housing 4 on its high-pressure side.

The inner piston has a radially projecting, annular ridge 11b, which has an O-ring on its radial outer side, adjacent a cylindrical inner wall of the housing 4, here part 4a. Furthermore, the inner wall of the housing 4, here part 4a, has an O-ring positioned to the connection side, securely positioned on the outer wall of the inner piston 11, opposite the above-described O-ring. Between the inner piston 11 and the housing 4, here part 4a, and between the two above-described O-rings, an annular space 20 is formed constituting a control compartment, as in FIGS. 4-6, that is pressurized by hydraulic fluid. This pressurization occurs here via a passage passing through the inner piston and opening in the connection 20c into the annular space/control compartment 20.

To the extent that this control compartment 20 is depressurized, the compression spring 21, here on the outside of the housing 4, causes the inner piston 11 to be moved toward the fluid supply port 14 (not shown), i.e. into the housing 4. To this end, the compression spring 21 is supported on the plug side by the housing 4, here part 4*b*, and on the connection side by the inner piston 11 projecting from the housing, which is not shown.

By moving the inner piston 11 to the connection side, all of the assembly of the inner piston 11, plunger 12, and pusher sleeve 13 is moved. The fluid passage between the pusher sleeve 13 and the plunger 12 remains closed, as a closing force acts on the pusher sleeve 13 toward the seat surface 12*b* of the plunger 12, generated by the compression spring 22 and acting between the pusher sleeve 13 and the inner piston 11.

This movement causes the socket 1 to take the position shown in FIG. 11, whereby the retaining sleeve 16 remains in its original position and is not moved along with it. This is caused by the biasing toward the plug caused by a compression spring 17 positioned on one side of the retaining sleeve 17, and, on the other side, on the housing 4 or a part fixed thereto.

Figure 12:
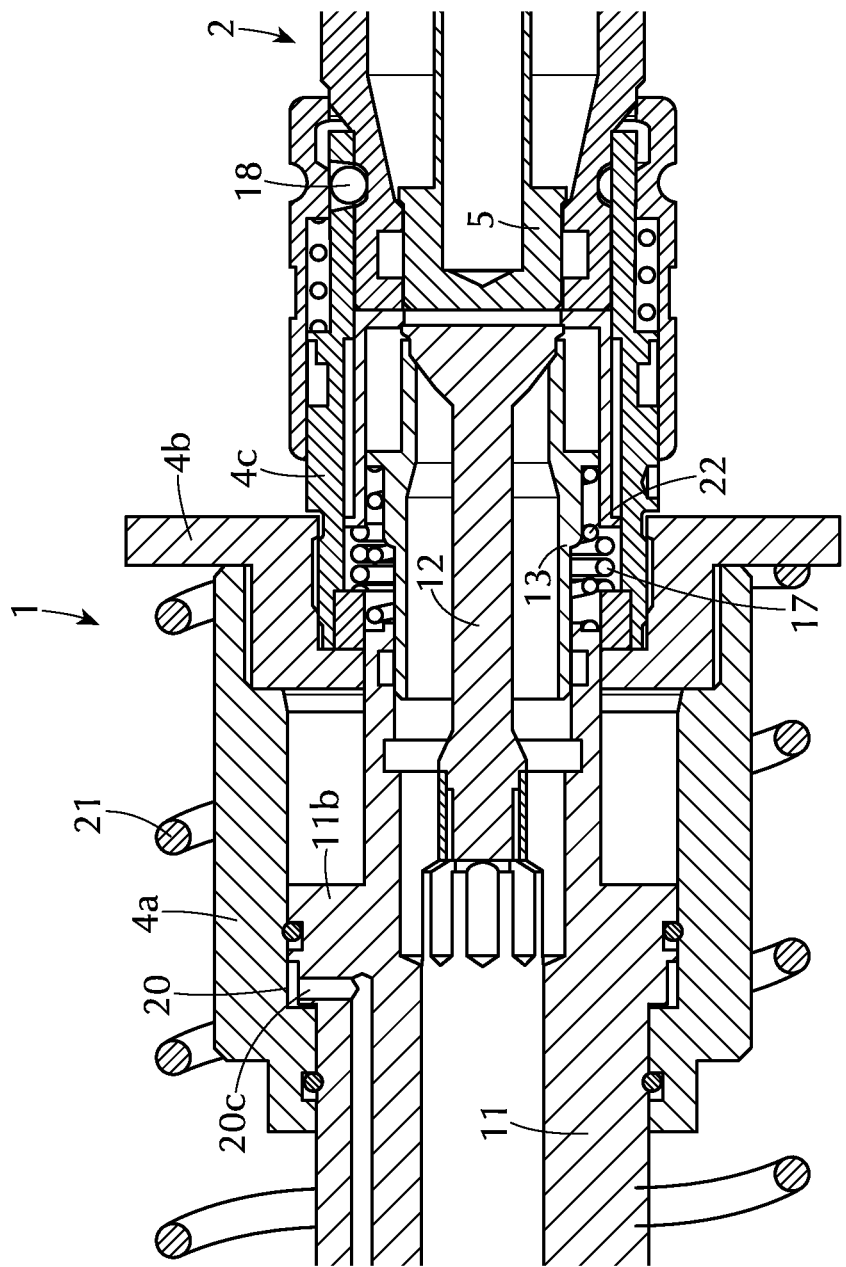

As shown in FIG. 12, the hydraulic coupling plug 2 can now be inserted into the socket 1, which merely requires the retaining sleeve 16 to be moved against the spring force of the spring 17 into the housing 4, which can be carried out manually. It is inserted until the outer sides 12*a*/15*a* of the plunger 12 and the plunger 5 are lie adjacent or against each other.

In this position, the plug 2 can be interlocked with the socket 1, with the balls 18 engaging with the groove 19 and the sliding sleeve moving axially over these balls in order to prevent radial retraction.

Any pressurization of the inside of the inner piston 11 has no effect on movement of the above-described elements or the hermetic seal of the fluid passage, as such pressurization only exerts radial forces on the pusher sleeve 13, and it always remains in position, in particular is not moved axially. The above-described coupling process can thus be carried out if both the plug 2 and the socket 1 are under pressure.

If the control compartment 20 is pressurized by fluid supplied to the connection 20*c*, the forces acting axially on the annular ridge 11*b* cause the inner piston 11 to move together with the pusher sleeve 12 and the plunger 12 toward the locked plug 2, whereby the smaller forces of the spring 21 are overcome.

Figure 13:
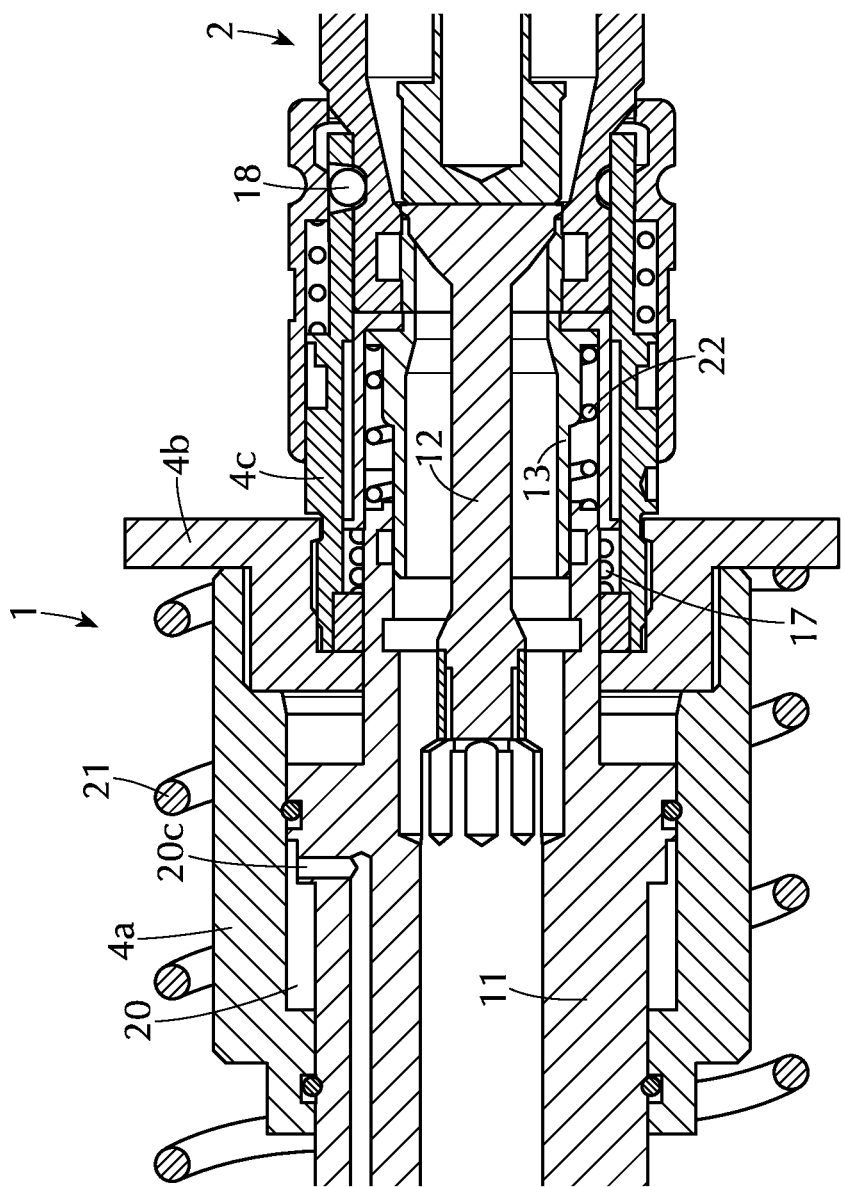

The plug-side end of the pusher sleeve 13 and the plunger 12 initially continue to enter the plug sealed, pressing its plunger 5 into the interior until the pusher sleeve 13 positions itself on a limit stop formed here by the inner side of the retaining sleeve into which the pusher sleeve has been coaxially inserted. The outer wall of the pusher sleeve 13 constitutes a seal with respect to the plug. This situation is shown in FIG. 13.

Figure 14:
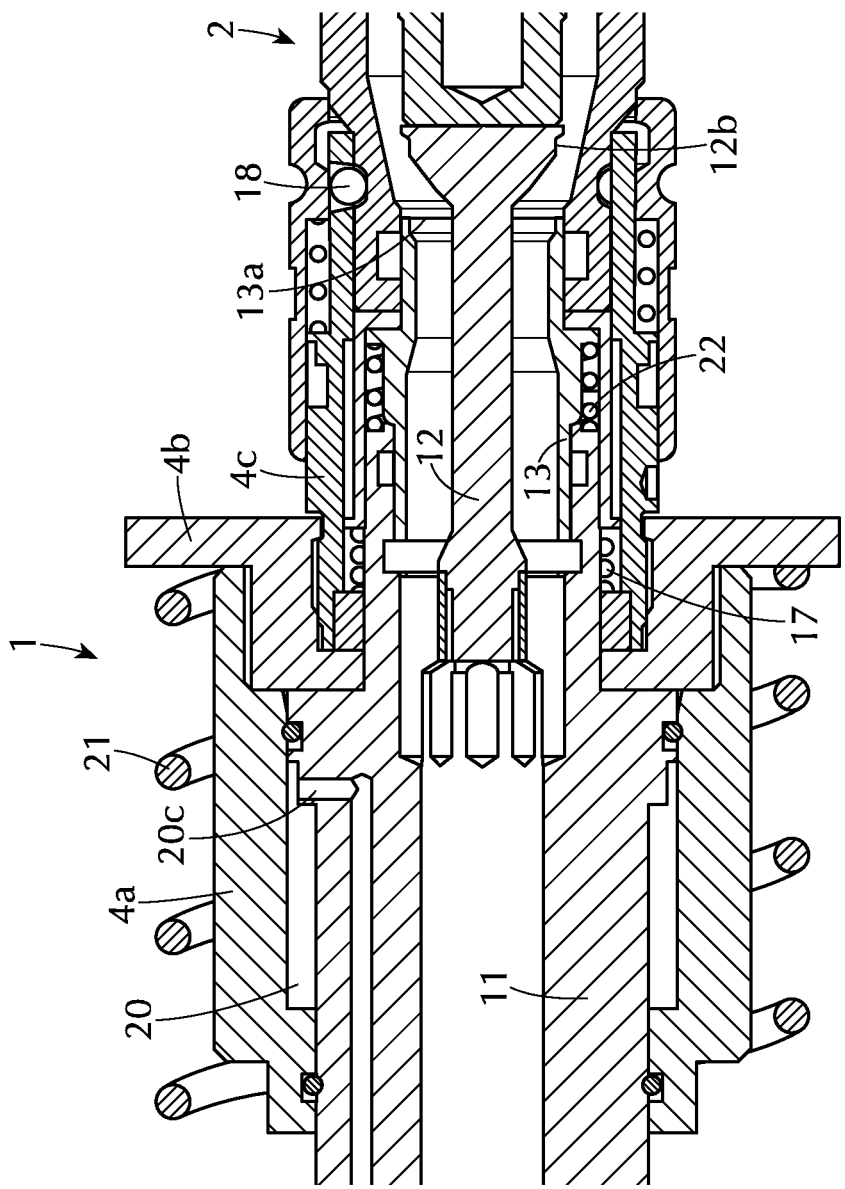

FIG. 14, on the other hand, shows the further movement of the inner piston 11 together with the plunger 12 with the pusher sleeve 13 remaining in a stable position, causing the outer end face 13*a* of the pusher sleeve 13 to separate from the seat surface 12*b* of the plunger 12, opening the fluid passage of the socket 1. Simultaneously, the plunger 5 has been pressed so far inside the plug 2 that it, too, opens the plug-side fluid passage, such that fluid can flow through the socket 1 and the plug 2.

This embodiment, too, thus has the advantage that the fluid passage is only opened once a previous locking has taken place, and this locking can further be carried out by hand, with the plug and the socket being automatically opened by forces generated hydraulically.

Figure 15:
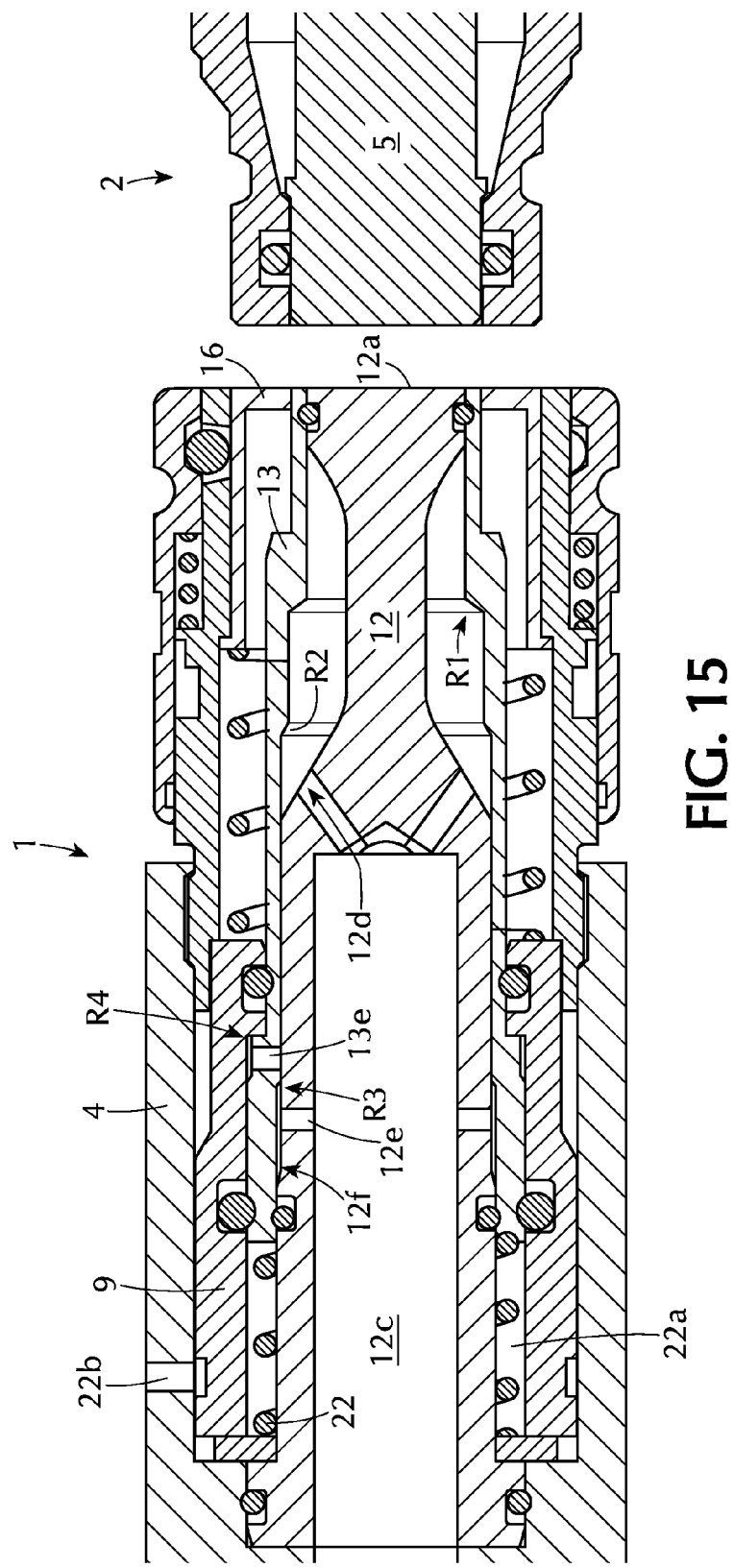
FIGS. 15-17 show a fourth embodiment during the coupling process in chronological order.
Figure 16:
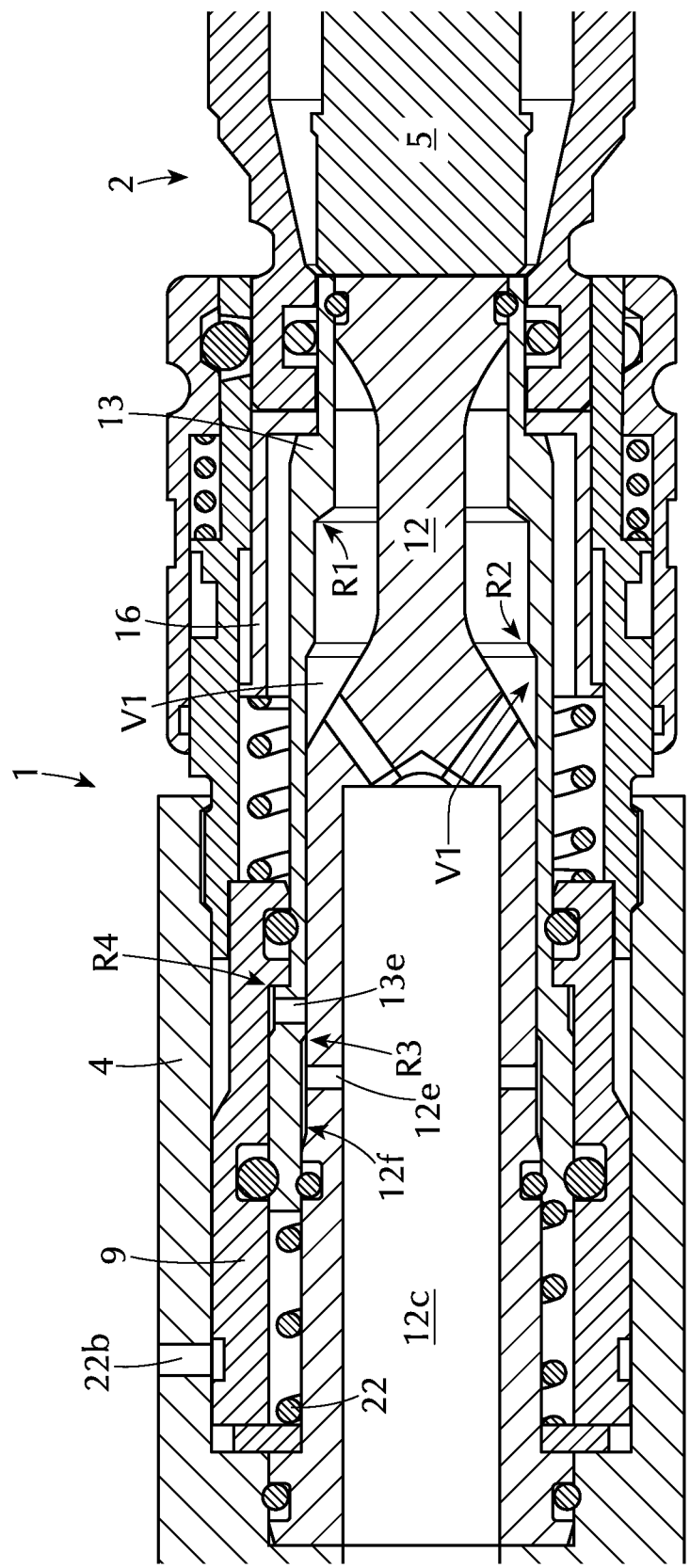
Figure 17:
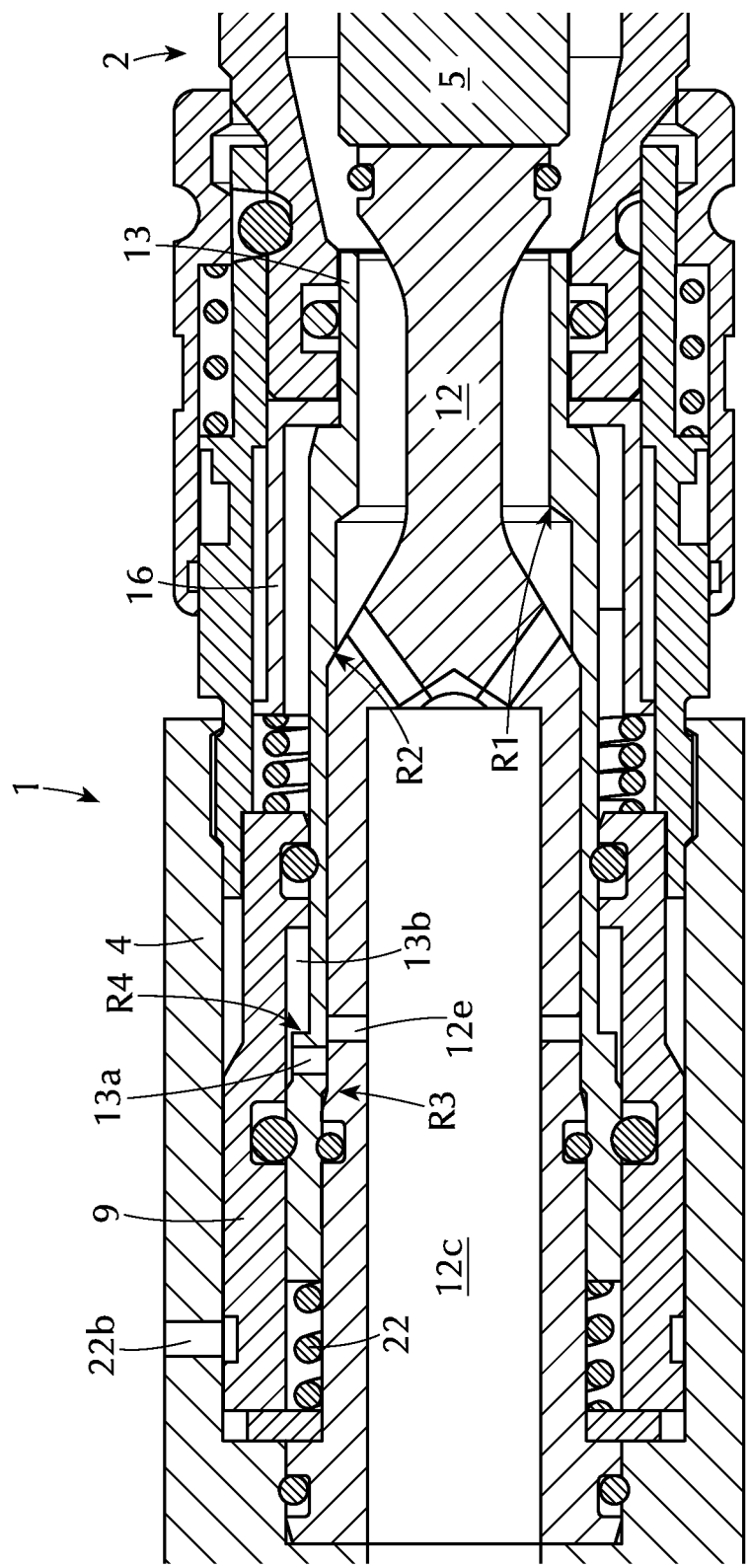

FIGS. 15-17 describe another embodiment, in which the plunger 12 is fixed position in the hydraulic coupling socket 1, and only the pusher sleeve 13 is axially and coaxially movably on it.

Here, depressurization of the socket is achieved by the fact that no effective forces acting axially are present.

This is achieved by the fact that the plunger 12 has an internal coaxial passage 12*c* opening into openings 12*d* on the outer surface of the plunger 12, and through which the inside of the pusher sleeve 13 is thus pressurized with hydraulic fluid.

The fluid exerts force on all the inner wall surfaces of the pusher sleeve 13, whereby pressure on axially parallel walls only generates radial forces that cannot counteract coupling.

All surface areas pressurized axially by the hydraulic fluid, on the other hand, also generate axial forces. Here, the pusher sleeve 13 is of a diameter stepped down three times toward the end face 12*a* of the plunger 12, thus forming annular shoulder surfaces R1, R2, and R3. These annular surfaces generate axial forces that counteract movement of the pusher sleeve out of the seat surface of the plunger in the area of its end face 12*a*. Here, it is advantageous for the seat surface to be radially sealing.

According to the invention, the sum of these forces be cancelled out, to which end the pusher sleeve 13 has another annular surface R4, here on the outside, which is also pressurized from the inside of the pusher sleeve with hydraulic fluid, generating a countervailing force. There, the outer diameter of the pusher sleeve 13 tapers off toward the end face 12*a* of the plunger 12.

This annular surface R4 is pressurized here by hydraulic fluid that can enter via a passage 13*a* in the wall of the pusher sleeve 13 from its inside into an annular space 13*b*, best recognizable in FIG. 17. This annular space is formed here between the pusher sleeve 13 and an insert 9 in the housing 4. Axially on both sides of the passage 13*a* in the wall of the pusher sleeve 13, the pusher sleeve 13 runs securely on the inner wall of the insert 9, such that the annular space 13*b* is formed between the seals and the walls of the pusher sleeve 13 and the insert 9.

Because, in the embodiment shown here, the inner wall of the pusher sleeve extends axially along the outer wall of the plunger to form a radial passage 12*e* through which the hydraulic fluid can initially enter an annular space 12*f*, then enter the annular space 13*b* through the passage 13*a*, for better fluid supply in the wall of the plunger between its inner passage 12*c* and its outside.

The annular space 13*b* here is sized such that it serves as a reservoir for fluid displaced from its interior during movement of the pusher sleeve. Thus, a comparison of FIGS. 16 and 17 shows that the volume fraction V1, which can still be seen in FIG. 16 has been displaced from inside of the pusher sleeve by this movement. This volume corresponds to the volume of the annular space 13*b*, such that an internal repositioning of the fluid has taken place during movement.

Insertion of the plug 2 shown separately in FIG. 15 can be seen in FIG. 16, whereby initially only the retaining sleeve 16 is axially moved into the housing 4, and the plunger 5 is pressed back into the inside of the plug by the fixed plunger 12, opening its fluid passage.

After the retaining sleeve engages a limit stop of the pusher sleeve 13 during insertion, the latter is moved along with it, opening, as shown in FIG. 17, the fluid passage through the sockets at the moment of the locking of the plug with the socket, as described several times above.

FIGS. 15-17 further show that the pusher sleeve 13 must only be axially moved against a force exerted by the compression spring 22 held in an annular space 22*a* between the insert 9 and the plunger 12. This annular space 22*a*, too, can be pressurized by fluid, in particular via the passage 22*b* that runs through the housing and the insert 9 into the annular space 22a. Thus, pressurization of the socket can simply assist in the closing of the socket, as this pressure acts on the supply-side annular end face of the pusher sleeve 13, pushing it into the seat surface on the plunger. In any case, however, this is also ensured by the compression spring 22, when the plug is unlocked and pulled out of the socket.

Figure 18:
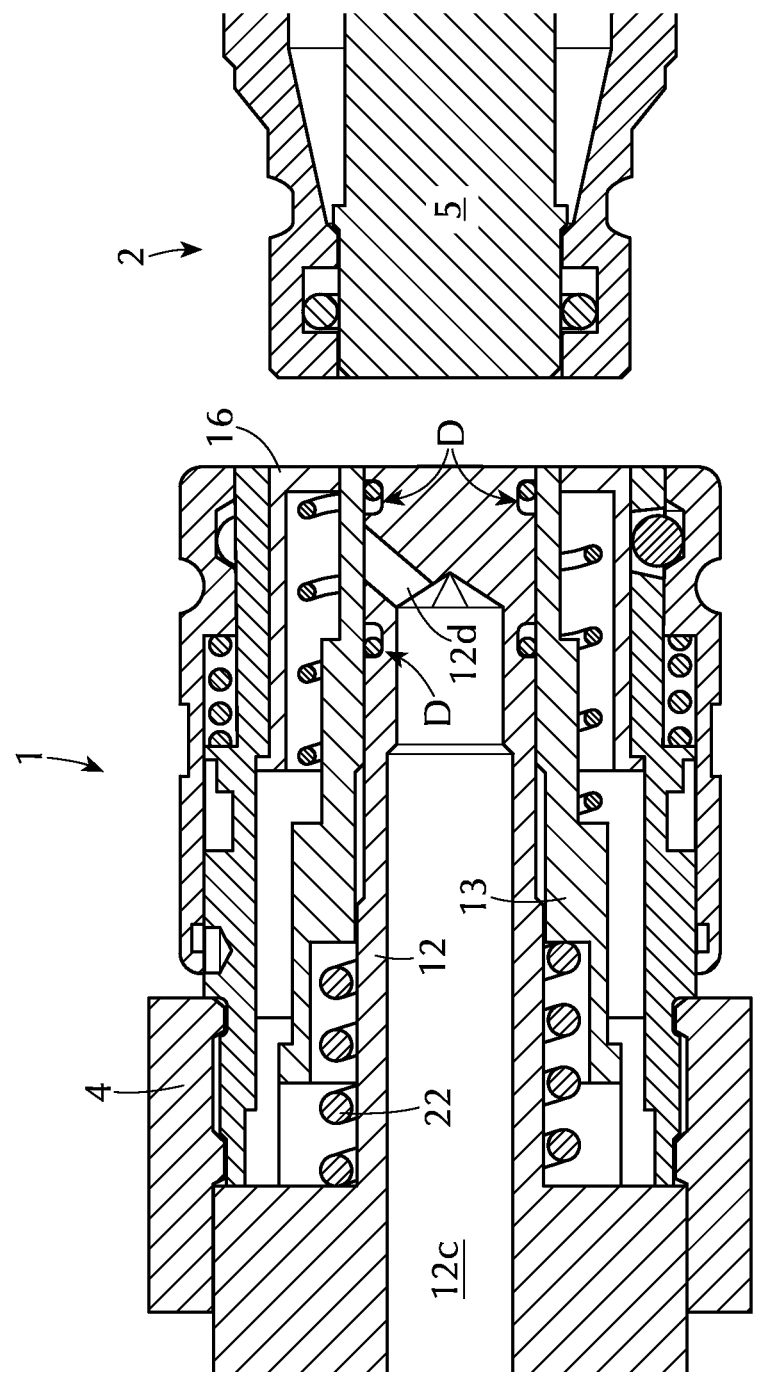
FIGS. 18-20 show a fifth embodiment during the coupling process in chronological order.
Figure 19:
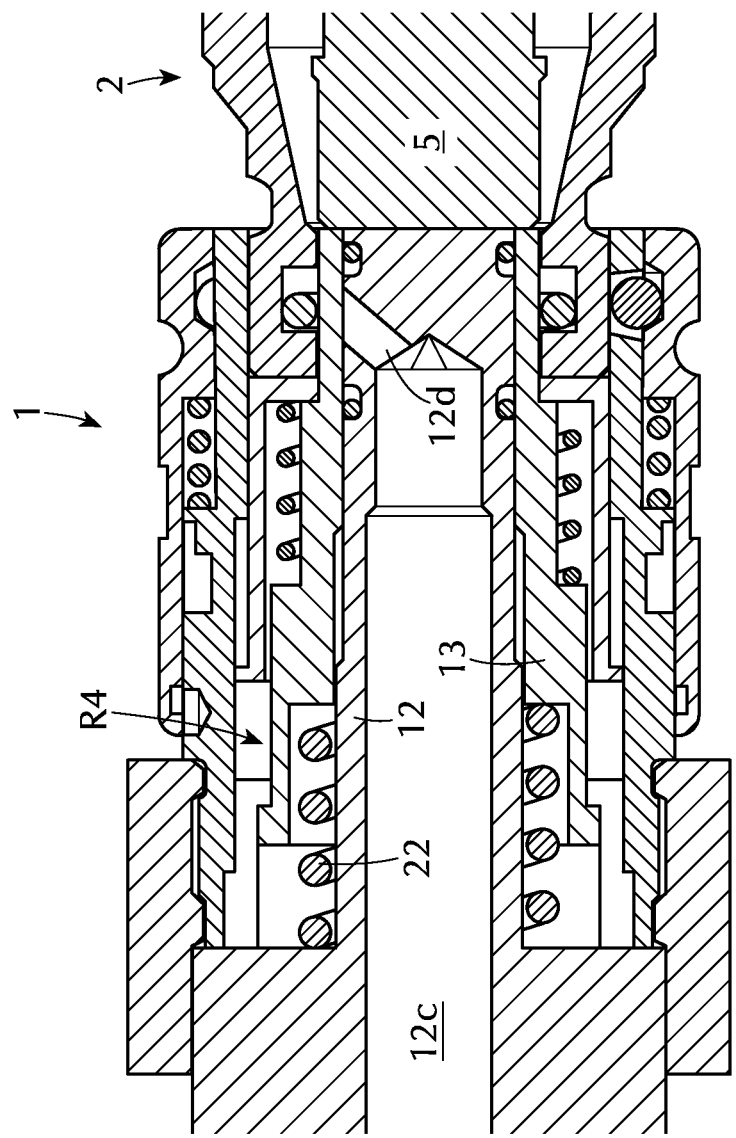
Figure 20:
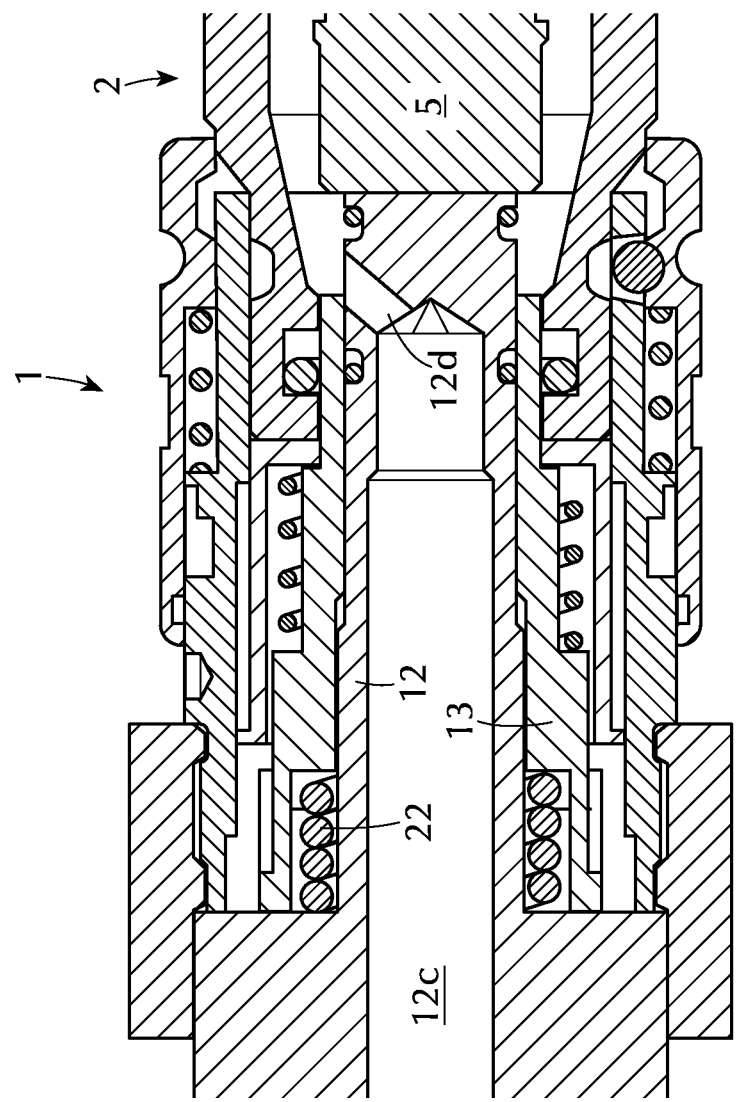

FIGS. 18-20 show a last embodiment, in which the seals D are axially spaced on plunger part of the same diameter outward and inward of the opening 12d through which the pusher sleeve 13 is pressurized from inside. The inner wall of the pusher sleeve 13 and the outer wall of the plunger 12 have the same diameter in the area between the seals D, and are cylindrical, such that the opening 12d lies radially opposite the inner wall of the pusher sleeve 13 without any spacing between them. Thus, the stored hydraulic fluid can only exert radial force on the pusher sleeve 13 here. In the area in which the hydraulic fluid can act on the pusher sleeve between the seals D, the pusher sleeve has no surface areas capable of generating axial force.

Here, the pusher sleeve, in turn, is only biased by the compression spring 22 acting between the pusher sleeve and the plunger 12 or the housing 4, and is held by the seals 22 until a plug 2 is inserted into the socket 1, as shown in chronological order by FIGS. 18-20.

As in the previous embodiment, here, the seal between the pusher sleeve 13 and the plunger 12 is formed only radially, i.e. the pusher sleeve 13 lies coaxially over the plunger, so that the end faces of both parts are on one plane, in particular together with the retaining sleeve 16 and the end face of the housing.

The invention claimed is:

1. A hydraulic coupling socket comprising:
an axially extending housing sleeve defining an axis;
an axially centered and coaxial plunger in the housing sleeve having opposite end faces and an inner passage pressurizable by hydraulic fluid and extending from a hydraulic fluid supply port and extending toward the plunger;
an axially movable pusher sleeve surrounding this plunger, the inner passage open axially in front of one of the end faces of the plunger into at least one opening on an outer surface of the plunger and through which the usher sleeve is pressurized from inside, the pusher sleeve and the plunger being sealed and movable position on one another axially inward and outward of the at least one opening;
an axially movable retaining sleeve surrounding the pusher sleeve and having an outer surface in the housing,
latch elements movable radially on the outer surface, bracing or freeing the outer surface, and having an annular end face that is at least substantially coplanar with end faces of the plunger and of the housing sleeve in a decoupled position; and
means for pressurizing the pusher sleeve internally by a hydraulic fluid conducted through the socket in a manner at least substantially free of axial forces.

2. The socket according to claim 1, wherein the pusher sleeve is biased by a compression spring toward the one of the end faces of the plunger.

3. The socket according to claim 1, wherein, axially inward and outward of the at least one opening, the pusher sleeve and the plunger are secured adjacent one another, surfaces being provided on the pusher sleeve that are pressurized by the hydraulic fluid, of which at least one surface generates forces acting axially on the pusher sleeve toward the hydraulic fluid supply port, and of which at least one surface generates forces acting axially on the pusher sleeve toward the plunger, the forces vectorially canceling one another out or adding up to a remaining force that can be overcome manually during coupling.

4. The socket according to claim 1, wherein at least one surface of the pusher sleeve pressurized by the hydraulic fluid generates a force directed axially to the hydraulic fluid supply port and is provided on an outer wall of the pusher sleeve that is pressurized by hydraulic fluid through a connection passage in the pusher sleeve wall from inside.

5. The socket according to claim 4, wherein the connection passage connects an external annular space adjacent the pusher sleeve from outside to inside the pusher sleeve and/or the passage of the plunger, the external annular space being formed between the pusher sleeve and the housing sleeve or between the pusher sleeve and an insert in the housing sleeve.

6. The socket according to claim 5, wherein the external annular space forms a reservoir accepting hydraulic fluid moved from inside the pusher sleeve during a movement in which an increase in volume of the external annular space caused during moving corresponds to a decrease in internal volume of the pusher sleeve.

7. The socket according to claim 1, wherein, axially inward and outward of the at least one opening, the pusher sleeve and the plunger are secured adjacent each other.

8. The socket according to claim 7, wherein, at one of the respective end faces, an outer surface of the plunger and an inner surface of the pusher sleeve are cylindrical with substantially the same diameter such that the at least one opening is radially opposite and immediately juxtaposed with the inner surface of the pusher sleeve.

9. A hydraulic coupling socket comprising:
an axially extending housing sleeve,
an axially extending pusher sleeve surrounding the housing sleeve,
a plunger inside the housing sleeve,
an axially movable pusher sleeve surrounding the plunger,
an axially extending retaining sleeve surrounding the pusher sleeve and having a radially directed surface,
a hydraulic coupling plug having latch elements in the housing sleeve, bracing or freeing the radially directed surface, and having an annular end face that is at least substantially coplanar with end faces of the plunger and the housing sleeve in a decoupled position,
a limit stop,
an inner piston in the housing sleeve that is fixed to the plunger and that can be moved axially with the housing sleeve such that, starting in the decoupled position, the plunger, the inner piston, and the pusher sleeve being movable jointly and axially into the housing sleeve up to an end position in which the hydraulic coupling plug can interlock with the hydraulic coupling socket via the latch elements, and, from the end position, first the plunger, the inner piston, and the pusher sleeve are moved jointly back up to a stop position in which the pusher sleeve is axially fixed to the limit stop, and, from the stop position, the plunger and the inner piston alone can be pushed further back, at least until a fluid passage is opened until the end faces of the plunger are coplanar with the end faces of the housing sleeve.

10. The socket according to claim 9, wherein the inner piston is biased by hydraulic fluid in at least one control compartment that is delimited at least partially by an end face of the inner piston in which the at least one control compartment annularly surrounds the inner piston and is delimited by the inner piston and the housing sleeve.

11. The socket according to claim 9, wherein the inner piston projects movably out of the housing sleeve on the side facing away from the hydraulic coupling plug, and has a supply port for the hydraulic fluid and connected through the inner piston with the fluid passage inside the pusher sleeve.

12. The socket according to claim 9, wherein the inner piston is formed with a hydraulic fluid control line opening into the control compartment.

13. The socket according to claim 9, wherein the inner piston is biased by the hydraulic fluid.

14. The socket according to claim 13, wherein the inner piston is movable in an insert in the housing sleeve, which insert is surrounded by the hydraulic fluid through the hydraulic coupling socket, a control compartment delimited by the inner piston is in the insert, which control compartment has a separate fluid supply and drain.

15. The socket according to claim 14, wherein the pusher sleeve has fluid passages running radially or diagonally to a longitudinal axis of the pusher sleeve and conducting the hydraulic fluid surrounding the insert into the pusher sleeve.

16. The socket according to claim 9, wherein the inner piston separates two control compartments from one another, movement of the inner piston increasing volume of one of the two control compartments and decreasing volume of the other of the two control compartments.

17. The socket according to claim 16, wherein the two control compartments are formed by an annular space coaxially surrounding the inner piston, and divided by an annular ridge on an outer surface of the inner piston, end faces on the inner piston axially flanking the ridge each delimiting a respective one of the control compartments.

18. The socket according to claim 16, wherein the control compartment whose volume increases with movement of the inner piston during insertion of a hydraulic coupling plug into the hydraulic coupling socket is connected with an interior of the hydraulic coupling socket through which the hydraulic fluid is conducted through the socket to the plug.

19. The socket according to claim 16, wherein the control compartment whose volume decreases with movement of the inner piston during insertion of a hydraulic coupling plug into the hydraulic coupling socket has a connection connected by a drainage line to receive displaced hydraulic fluid to a low-pressure accumulator or by a supply port for supplying hydraulic fluid to the control compartment to a high-pressure accumulator.

20. A socket assembly comprising:
at least two of the sockets according to claim 18 and one high-pressure accumulator each receiving and supplying fluid, and
a low-pressure accumulator, each of the accumulators being connected simultaneously with the control compartments of all sockets by at least one valve, whose volume decreases with movement of the inner piston during insertion of a hydraulic coupling plug into the hydraulic coupling socket.

21. The socket assembly according to claim 20, further comprising:
a hydraulic switching valve having high-pressure and low-pressure input sides and one output side, the high-pressure input side being connectable with the output side and the output side being connectable via a check valve with the accumulator to output fluid, to the high-pressure accumulator, and to at least one of the input sides that is connected to an interior of a respective one of the at least two sockets.

22. The socket assembly according to claim 20, further comprising:
two check valves having respective input sides both connected with the low-pressure accumulator for receiving fluid and respective output sides connected with an interior of a respective one of the two sockets.

23. A method for coupling a hydraulic coupling plug with a hydraulic coupling socket according to claim 9, wherein the plunger, the inner piston, and pusher sleeve are moved jointly and axially into the housing sleeve up to an end position in which a hydraulic coupling plug interlocks with the hydraulic coupling socket via the latch elements, and, from the end position, initially the plunger, the inner piston, and the pusher sleeve, are moved jointly up to a stop position in which the pusher sleeve axially reaches a limit stop, by biasing/pressurization of the inner piston, and, from the stop position, the plunger and the inner piston are alone moved further, at least until a fluid passage is opened until the end faces of the plunger are coplanar with the end faces of the housing sleeve.

24. The method according to claim 23, wherein joint movement of the plunger, the inner piston, and the pusher sleeve is caused by a change in pressure in a control compartment at least partially delimited by the inner piston.

25. The method according to claim 23, wherein the plunger, the inner piston, the pusher sleeve, and the retaining sleeve are moved jointly by the application of manual force to the inner piston generated by insertion of the hydraulic coupling plug into the hydraulic coupling socket.

* * * * *